(12) United States Patent
Cherian et al.

(10) Patent No.: US 12,459,115 B2
(45) Date of Patent: Nov. 4, 2025

(54) SYSTEM AND METHOD FOR CONTROLLING A ROBOT

(71) Applicant: Mitsubishi Electric Research Laboratories, Inc.

(72) Inventors: Anoop Cherian, Cambridge, MA (US); Xiulong Liu, Cambridge, MA (US); Sudipta Paul, Cambridge, AL (US); Moitreya Chatterjee, Cambridge, AL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 195 days.

(21) Appl. No.: 18/178,882

(22) Filed: Mar. 6, 2023

(65) Prior Publication Data

US 2024/0300096 A1 Sep. 12, 2024

(51) Int. Cl.
*B25J 9/16* (2006.01)
*B25J 13/00* (2006.01)

(52) U.S. Cl.
CPC .............. *B25J 9/163* (2013.01); *B25J 9/161* (2013.01); *B25J 9/1664* (2013.01); *B25J 9/1697* (2013.01); *B25J 13/003* (2013.01)

(58) Field of Classification Search
CPC . B25J 9/163; B25J 9/161; B25J 9/1664; B25J 9/1697; B25J 13/003
See application file for complete search history.

(56) References Cited

U.S. PATENT DOCUMENTS

| | | | | |
|---|---|---|---|---|
| 10,963,493 B1 * | 3/2021 | Hu | ......................... | G06N 3/042 |
| 11,210,585 B1 * | 12/2021 | Heess | ...................... | G06N 3/08 |
| 11,714,971 B2 * | 8/2023 | Wray | .................. | G05D 1/0221 |
| | | | | 701/23 |
| 12,014,284 B2 * | 6/2024 | Shen | ........................ | G06N 5/02 |
| 2018/0329878 A1 * | 11/2018 | Hirzel | ..................... | G06F 40/35 |
| 2019/0232489 A1 * | 8/2019 | Pascanu | ................ | G06N 3/096 |

(Continued)

OTHER PUBLICATIONS

Zhang et al., Multimodal Hierarchical Reinforcement Learning Policy for Task-Oriented Visual Dialog, OpenReview, Dec. 31, 2017, pp. 1-11 (Year: 2017).*

(Continued)

*Primary Examiner* — Sze-Hon Kong
(74) *Attorney, Agent, or Firm* — Gene Vinokur

(57) ABSTRACT

A controller for controlling a robot is provided. The controller comprises a hierarchical multimodal reinforcement learning (RL) neural network including a first level controller and three second level controllers. The second level controllers comprise a first sub level controller to receive input data based on predefined questions, a second sub level controller to receive the input data by generating a validation question based on state of the RL neural network and a third sub level controller to determine the input data based on state of the RL neural network. The controller is configured to select one of the second level controllers using the first level controller to perform a first interaction relating to a task based on the state of the RL neural network; generate a control command using the selected second level controller based on the corresponding input data; and control operation of the robot by executing control command.

20 Claims, 17 Drawing Sheets

(56) References Cited

U.S. PATENT DOCUMENTS

| | | | |
|---|---|---|---|
| 2020/0126676 A1* | 4/2020 | Willner | G06N 20/00 |
| 2021/0046650 A1* | 2/2021 | Deyle | G05D 1/0214 |
| 2021/0124843 A1* | 4/2021 | Vass | G06Q 30/0255 |
| 2021/0147079 A1* | 5/2021 | Soleyman | G06N 3/006 |
| 2021/0187733 A1* | 6/2021 | Lee | G06N 3/008 |
| 2021/0201172 A1* | 7/2021 | Shen | G06N 20/20 |
| 2021/0268645 A1* | 9/2021 | Miyazawa | G05B 19/0426 |
| 2023/0168670 A1* | 6/2023 | von Reventlow | B25J 9/163 |
| | | | 701/2 |
| 2023/0306048 A1* | 9/2023 | Wang | G06F 16/3344 |
| 2023/0326451 A1* | 10/2023 | Sundararajan | G10L 15/285 |
| | | | 704/270 |
| 2024/0020553 A1* | 1/2024 | Kwon | G06N 3/092 |
| 2024/0070434 A1* | 2/2024 | Garg | G06N 3/0455 |
| 2024/0104308 A1* | 3/2024 | Francis | G06V 20/70 |
| 2024/0104336 A1* | 3/2024 | Irving | G06N 3/092 |
| 2024/0197420 A1* | 6/2024 | Ruben | G06N 20/00 |
| 2024/0283868 A1* | 8/2024 | Ferris | G10L 15/22 |

OTHER PUBLICATIONS

Rosenthal et al., An Effective Personal Mobile Robot Agent Through Symbiotic Human-Robot Interaction, Proc. of 9th Int. Conf. on Autonomous Agents and Multiagent Systems (AAMAS 2010), May, 10-14, 2010 pp. 1-8 (Year: 2010).*

Rosenthal et al., Mobile Robot Planning to Seek Help with Spatially-Situated Tasks, 2012, Proceedings of the Twenty-Sixth AAAI Conference on Artificial Intelligence, pp. 2067-2073 (Year: 2012).*

Das et al., Neural Modular Control for Embodied Question Answering, 2018, Proceedings of The 2nd Conference on Robot Learning, pp. 1-10 (Year: 2018).*

AVLEN: Audio-Visual-Language Embodied Navigation in 3D Environments, Paul et al. 36 Conference on Neural Information Processing Systems.NeurIPS 2022.

SoundSpaces: Audio-Visual Navigation in 3D Environments, Chen et al., ECCV 2020.

Vision-and-Language Navigation: Interpreting visually-grounded navigation instructions in real environments, Anderson et al., CVPR 2018.

* cited by examiner

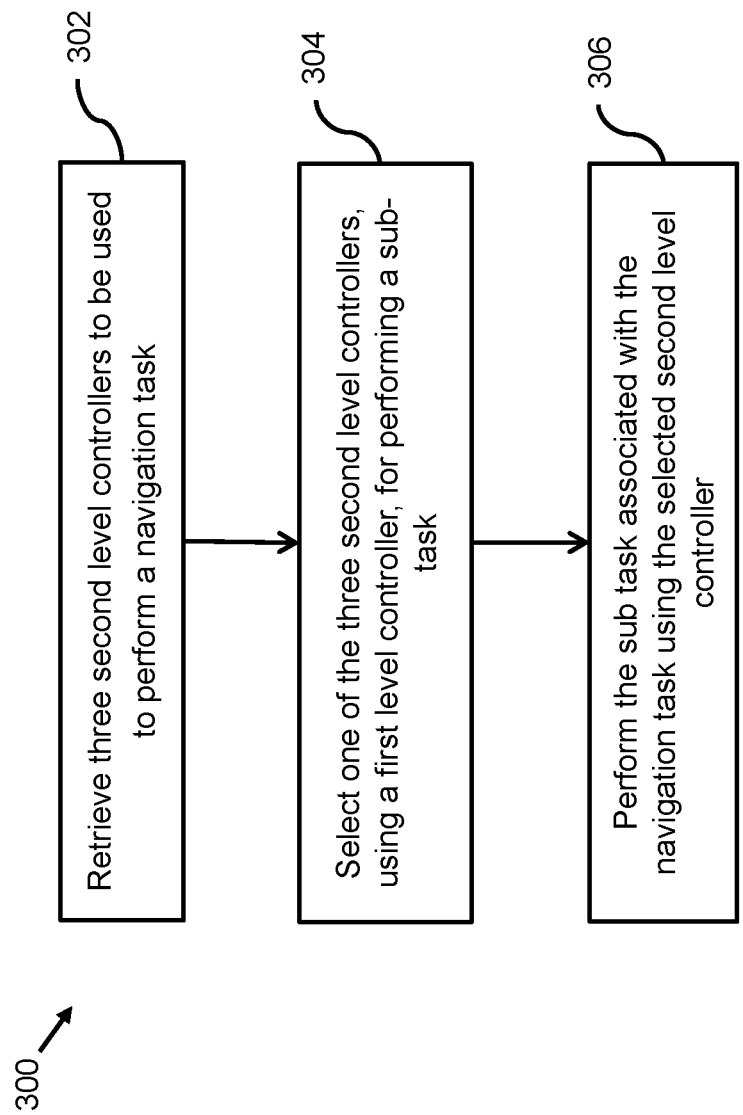

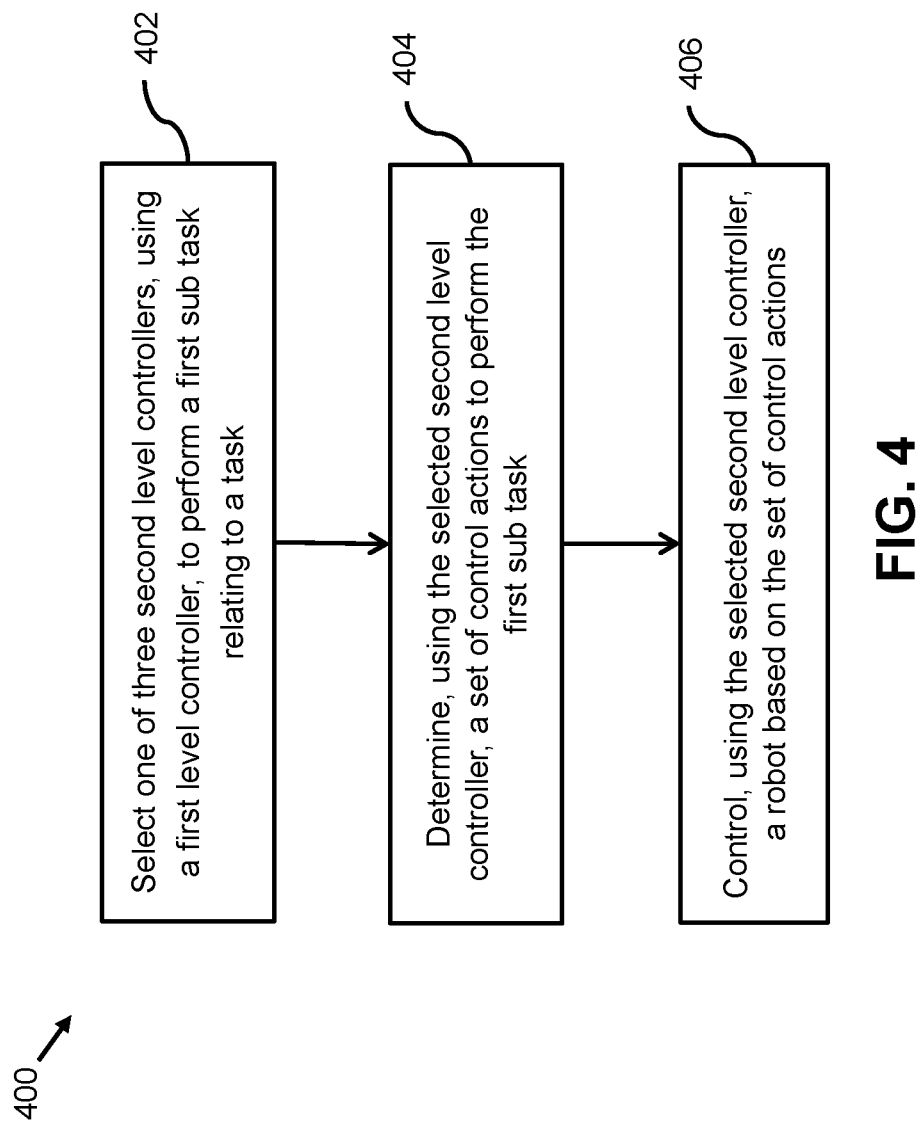

SYSTEM AND METHOD FOR CONTROLLING A ROBOT

TECHNOLOGICAL FIELD

The present disclosure relates generally to robot control, and more particularly to training and controlling a robot to perform a task based on different modes of input.

BACKGROUND

An objective of robotics and artificial intelligence (AI) is to create robotic agents that co-habit, assist and naturally interact with humans. With developments in deep neural networks, agents or robots have been built that may autonomously navigate a realistic three-dimensional environment for solving real world tasks. In an example, the task may relate to audio-goal navigation, i.e., visual navigation to localize objects that makes sound in an environment, a vision and-language navigation (VLN), i.e., navigation to a goal location following instructions provided in natural language or exploring a visual world seeking answers to a given natural language, and so forth.

However, the robots that are deployed and operate in realistic virtual worlds may be unable to navigate reliably through such environments. To address this shortcoming, reinforcement learning (RL) policies may be trained to use the visual environment and the 3D spatial directionality of the audio to navigate. However, in real-world situations, the audio may be sporadic, intermittent, or garbled with other sounds such that localization of the audio may be challenging. Therefore, the robot may fail to operate reliably in realistic virtual worlds to perform the navigation tasks. In particular, such a sound is sporadic, and thus the robot must use semantic knowledge of the audio-visual modality to reach a goal. Moreover, such an event needs to be catered to timely and the robot may have to minimize a number of navigation mistakes it makes. In order to minimize mistakes, the robot may have to seek help from an oracle for navigation guidance rather than taking incorrect navigation steps in such uncertain circumstances and thus delaying progress on navigation task in order to reach the goal.

A key challenge for the robot to succeed in its navigation task is to equip the robot with a capability to decide when to use the audio-visual cues from environment for navigation and when to interact with an oracle.

However, such interactions with the oracle poses a trade-off, i.e., interacting with the oracle far too often may affect autonomy the robot and may also be less desirable if the oracle is a human whereas fewer interactions might result in the robot endlessly exploring the environment without reaching the goal. In addition, instructions provided to the robot in natural language may be difficult to translate to navigable instructions owing to noise and complexity of natural language. Therefore, the robot may suffer from various limitations, such as increased time of completion of a navigation task, failure to complete the navigation task, performing the navigation task incorrectly, loss of feasibility of path planning to complete the navigation task and compromised path quality (such as extra maneuvers, increased cost, and reduced accuracy) owing to restriction on number of modalities of input for completing the task, especially in a realistic virtual world.

SUMMARY

It is an object of some embodiments to disclose a bi-directional audio-visual-language embodied navigation (BI-AVLEN) technique that allows localization of an audio source in a realistic visual world and bi-directional interaction with an oracle. It is another object of some embodiments to disclose a BI-AVLEN method where an audio source is localized in a realistic visual world and bi-directional interaction with oracle is performed for efficient navigation towards the audio source. It is another object of some embodiments to disclose that a robot possesses abilities to use audio-visual cues effectively as well as the robot is equipped to seek human assistance when it is uncertain, such as when the audio source is sporadic or intermittent. It is another object of some embodiments to provide such a system and a method that decides a type of input cue to be received by selecting a sub-level controller relating to corresponding modality, for example, audio, visual or short natural language sentences.

It is an object of some embodiments to disclose a BI-AVLEN robot that interacts with an oracle to ask questions and receive instructions in free-form natural language.

Some embodiments are based on the realization that a robot may have to decide when to ask a query or seek help from an oracle for navigation instructions, and when to follow the audio-visual cues to reach a goal or an audio source. The determination for when to query an oracle or navigate based on audio-visual cues is crucial as asking too many queries may affect autonomy of the robot and is less preferred if the oracle is a human, and querying too few times may make the robot explore a scene endlessly without reaching the goal.

Some embodiments are based on the realization that creating robots that may seamlessly interact in natural language with an oracle or humans is very useful in a variety of real world scenarios. Examples of such scenarios may include, but are not limited to, autonomous vehicle navigation incorporating human suggestions, robot-assisted assembly, and robotic search and rescue.

Some embodiments are based on the recognition that a human-robot interaction scenario may be used to enable the BI-AVLEN robot to autonomously navigate a 3D scene to localize an object in the scene that makes a sound, i.e., to navigate and reach an audio goal and perform an audio-goal navigation task.

Some embodiments are based on the recognition that audio produced by an audio source may be sporadic, intermittent, or garbled with other sounds such that localization may be challenging. Therefore, rather than taking incorrect navigation steps in such uncertain circumstances and thus delaying progress on the navigation task, the robot may benefit from natural language interaction with an oracle to seek help for navigation guidance.

When instructions provided to the robot are in natural language, such instructions are often noisy and difficult to correctly translate to navigable instructions. The determination of when to query the oracle as well as how to query the oracle needs to be considered, which may result in less time for translating the natural language instructions, less load on the oracle for answering, establishing better communication between the oracle and the robot, and reaching the goal timely.

Some embodiments are based on the recognition that a Self-Motivated Communication Agent (SCoA) may be able to query for help and use natural language feedback to assist its navigation. In this regard, the SCoA may only be able to ask template questions filled with labels of detected scene objects. However, SCoA may lack bi-directional interaction ability that allows more effective communication with the oracle, and thus fail to converse in freeform natural language. This may affect practical deployment of such SCoA leading to confusion, user frustration, high cost of navigation, and inefficient operation of the robot.

Some embodiments are based on the recognition that the aforementioned challenges during audio-goal navigation to an audio source may be addressed by training the BI-AVLEN using a multi-modal hierarchical reinforcement learning. A multimodal hierarchical reinforcement learning (RL) module consists of a first level controller having a high-level policy that is trained to decide whether and when to use audio-visual cues to navigate, interact with the oracle in a question mode when uncertain where to navigate, or seek navigation instructions directly from the oracle in a query mode when unsure what to ask.

Some embodiments are based on the recognition that each of the choices of the first level controller has corresponding second level controllers. The second level controllers have low-level policies driving the robot to its goal, thereby making the BI-AVLEN model hierarchical.

Some embodiments are based on the recognition that offline training of the first level controller having the high-level policy and the second level controllers having the low-level policies maximizes a success rate on a navigation task while penalizing for incorrect questions or frequent oracle interactions, thereby enabling the BI-AVLEN robot to reach the audio goal with minimal help during inference.

Some embodiments are based on the recognition that equipping the robot with bi-directional interaction abilities leads to significant gains in performance, especially for localizing new sounds or in the presence of audible distractions.

Some embodiments are based on the understanding that a BI-AVLEN robot may localize and navigate to an audio source in a realistic visual world. Moreover, the BI-AVLEN robot is capable of fully engaging in a natural language conversation with an oracle or a human for navigation guidance whenever needed. Specifically, the BI-AVLEN robot may either use audio-visual cues for its navigation or interact with the oracle in any one of two distinct modes when the robot is uncertain about which navigation step to take.

It is an object of some embodiments of the present disclosure to disclose second level controllers, such as a first sub level controller relating to a query mode in which the robot is unsure of what question to ask (e.g., when there are no useful landmarks in a scene) and directly seeks navigation instructions from the oracle.

It is an object of some embodiments of the present disclosure to disclose second level controllers, such as a second sub level controller relating to a question mode in which the robot forecasts a plausible trajectory that it estimates will take it to the audio-goal, frames a natural language validation question using this forecasted trajectory, and seeks a verification or validation from the oracle.

It is an object of some embodiments of the present disclosure to disclose second level controllers, such as a third sub level controller relating to audio or visual goal based navigation. Using the third sub-level controller, the BI-AVLEN robot uses, for example, audio-visual cues in the environment to navigate to the audio source.

Some embodiments of this disclosure are based on the realization that the BI-AVLEN robot learns to implicitly model its uncertainty in deciding the navigation steps and seeks help from an oracle for navigation instructions provided in short natural language sentences or by way of a validation question.

Some embodiments of the present disclosure are based on unifying and generalizing audio-visual navigation with natural language instructions to build a complete audio-visual-language embodied AI navigation robot.

Some embodiments of the present disclosure are based on a new type of hierarchical reinforcement learning framework that jointly learns policies for the robot to decide when to query the oracle, how to query the oracle (such as in a query mode or a question mode), how to navigate using audio-goal, and how to use the provided natural language instructions.

Some embodiments of the present disclosure are based on semantic audio-visual navigation on datasets with large-scale real-world environments with a variety of semantic objects and their sounds.

Accordingly, one embodiment discloses a controller for controlling a robot. The controller comprises a memory to store a hierarchical multimodal reinforcement learning (RL) neural network. The hierarchical multimodal RL neural network includes a first level controller and at least three second level controllers. The at least three second level controllers comprising a first sub level controller, a second sub level controller and a third sub level controller. The first sub level controller is configured to receive input data based on a set of predefined questions. The second sub level controller is configured to receive the input data by generating validation question based on a state of the hierarchical multimodal RL neural network. The third sub level controller is configured to determine the input data based on the state of the hierarchical multimodal RL neural network. The controller comprises a processor configured to select, using the first level controller, one of the at least three second level controllers to perform a first interaction relating to a task, based at least on the state of the hierarchical multimodal RL neural network; generate, using the selected second level controller, a control command based on the corresponding input data; and control an operation of the robot by executing the control command.

When the selected second level controller is the first sub level controller, the processor is further configured to cause the first sub level controller to select a first predefined question from the set of predefined questions based on the state of the hierarchical multimodal RL neural network; cause the first sub level controller to receive first input data comprising an answer to the first predefined question; and cause the first sub level controller to generate the control command based on the answer.

When the selected second level controller is the second sub level controller, the processor is further configured to receive a set of image frames, the set of image frames indicating at least depth occupancy map, or panoramic view surrounding the robot; cause the second sub level controller to generate the validation question based on the set of image frames and the state of the hierarchical multimodal RL neural network; cause the second sub level controller to receive second input data comprising a natural language validation response; and cause the second sub level controller to generate the control command based on the natural language validation response.

When the second input data comprises the natural language validation response and natural language instruction data, the processor is further configured to cause the second sub level controller to generate the control command based on the natural language validation response; and update the state of the hierarchical multimodal RL neural network based on the natural language instruction data and the execution of the control command.

When the second input data comprises a negative validation response or the second sub level controller fails to receive the second input data, the processor is further configured to cause to terminate operation of the second sub level controller; and cause to execute at least one of the first sub level controller or the third sub level controller for performing the first interaction, based on an external input.

When the second input data comprises a negative validation response or the second sub level controller fails to receive the second input data, the processor is further configured to cause the second sub level controller to generate a first control command based on the state of the hierarchical multimodal RL neural network; cause the second sub level controller to control the robot based on the first control command; cause the second sub level controller to update the state of the hierarchical multimodal RL neural network based on the execution of the first control command; and cause the second sub level controller to generate a second validation question based on the updated state of the hierarchical multimodal RL neural network.

The hierarchical multimodal RL neural network is trained end-to-end using the reinforcement learning without incurring a penalty when the validation question generated by the second sub level controller forms an answer to one of the set of predefined questions used by the first sub level controller to generate the control command.

The input data received by at least one of the first sub level controller or the second sub level controller is generated by an oracle.

During a training of the hierarchical multimodal RL neural network, the processor is further configured to receive a natural language validation response for the validation question from the oracle, based on the oracle decoding the validation question and providing the natural language validation response based on a matching between a shortest path between a current pose of the robot and a goal pose of the task, and a path based on the decoded validation question; and train the hierarchical multimodal RL neural network based on the natural language validation response.

When the selected second level controller is the third sub level controller, the processor is further configured to cause the third sub level controller to generate the control command based on the state of the hierarchical multimodal RL neural network.

The corresponding input data received by at least one of the first sub level controller or the second sub level controller is in natural language.

The processor is further configured to update, using the selected second level controller, the state of the hierarchical multimodal RL neural network based on the execution of the first interaction. The first interaction is performed between the controller and at least one of an environment, or an entity associated with the task. The processor is further configured to select, using the first level controller, one of the at least three second level controllers to perform a second interaction relating to the task, based at least on the input data, and the updated state of the hierarchical multimodal RL neural network. The second interaction is performed after the first interaction for completing the task.

The processor is further configured to determine a resource constraint associated with selection of each of the at least three second level controllers; and select, using the first level controller, one of the at least three second level controllers, based on the determined resource constraint.

According to some embodiments, at least one of: the input data or the state of the hierarchical multimodal RL neural network, as used by the first sub level controller, the second sub level controller and the third sub level controller are different.

According to some embodiments, the first sub level controller is configured to determine the control command based on a natural language instruction received in response to a first predefined question from the set of predefined questions; the second sub level controller is configured to determine the control command based on a natural language validation response for the generated validation question; and the third sub level controller is configured to determine the control command based on at least one of: sensor-based audio information or sensor-based video information.

According to some embodiments, the state of the hierarchical multimodal RL neural network comprises at least one of: a set of state variables associated with the state of the hierarchical multimodal RL neural network or a current belief state of the hierarchical multimodal RL neural network.

The processor is further configured to cause the selected second level controller to update the state of the hierarchical multimodal RL neural network based on the operation of the robot to execute the first interaction.

Another embodiment discloses a method for controlling a robot using a controller, the controller having a hierarchical multimodal reinforcement learning (RL) neural network, wherein the hierarchical multimodal RL neural network includes a first level controller and at least three second level controllers, the at least three second level controllers comprising a first sub level controller, a second sub level controller and a third sub level controller. The first sub level controller is configured to receive input data based on a set of predefined questions, the second sub level controller is configured to receive the input data by generating a validation question based on a state of the hierarchical multimodal RL neural network, and the third sub level controller is configured to determine the input data based on the state of the hierarchical multimodal RL neural network. The method comprising selecting, using the first level controller, one of at least three second level controllers to perform a first interaction relating to a task based at least on the state of a hierarchical multimodal RL neural network. The method comprising generating, using the selected second level controller, a control command based on the corresponding input data; and controlling an operation of the robot by executing the control command.

Yet another embodiment discloses a non-transitory computer readable storage medium embodied thereon a program executable by a processor for performing a method for controlling a robot using a controller, the controller having a hierarchical multimodal reinforcement learning (RL) neural network, wherein the hierarchical multimodal RL neural network includes a first level controller and at least three second level controllers, the at least three second level controllers comprising a first sub level controller, a second sub level controller and a third sub level controller. The first sub level controller is configured to receive input data based on a set of predefined questions, the second sub level controller is configured to receive the input data by generating a validation question based on a state of the hierarchical multimodal RL neural network, and the third sub level controller is configured to determine the input data based on the state of the hierarchical multimodal RL neural network. The method comprising selecting, using the first level controller, one of at least three second level controllers to perform a first interaction relating to a task based at least on the state of a hierarchical multimodal RL neural network.

The method comprising generating, using the selected second level controller, a control command based on the corresponding input data; and controlling an operation of the robot by executing the control command.

Some embodiments are based on the understanding that a robot is allowed to interact with an oracle or a different agent, receive feedback, and utilize this information for navigation. However, oracle instructions from existing approaches are limited to ground truth actions and direct mapping of specific number of actions to consecutive phrases. In certain cases, a fixed set of natural language instructions may be used as the oracle feedback. In such cases, such natural language instructions may be coupled with target image (or goal image) that the robot will face or see after completion of the task. However, the robot may be required to reach a specific location to query, which is impractical from a human oracle perspective. Therefore, it is an objective of the present disclosure to enable the robot to receive free-form natural language instructions as well as validations on planned navigation as feedback. The feedback may be obtained from any navigable point in the environment. In this way, the robot may receive input or feedback naturally and flexibly. Further, owing to generation of validation question, a load on the oracle for providing detailed and/or lucid or simple instructions may reduce substantially. In particular, the oracle may merely provide a natural language validation response that confirms or disapproves a belief of the validation question, i.e. belief of the robot. This may further ensure better communication between the oracle and the robot as noise and ambiguity associated with natural language instructions may be eliminated.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3 illustrates an example method for performing a navigation task using a hierarchical multimodal reinforcement learning (RL) neural network, according to some embodiments of the present disclosure.

FIG. 4 illustrates an example method for controlling the robot using a controller, according to some embodiments of the present disclosure.

DETAILED DESCRIPTION

Figure 1:
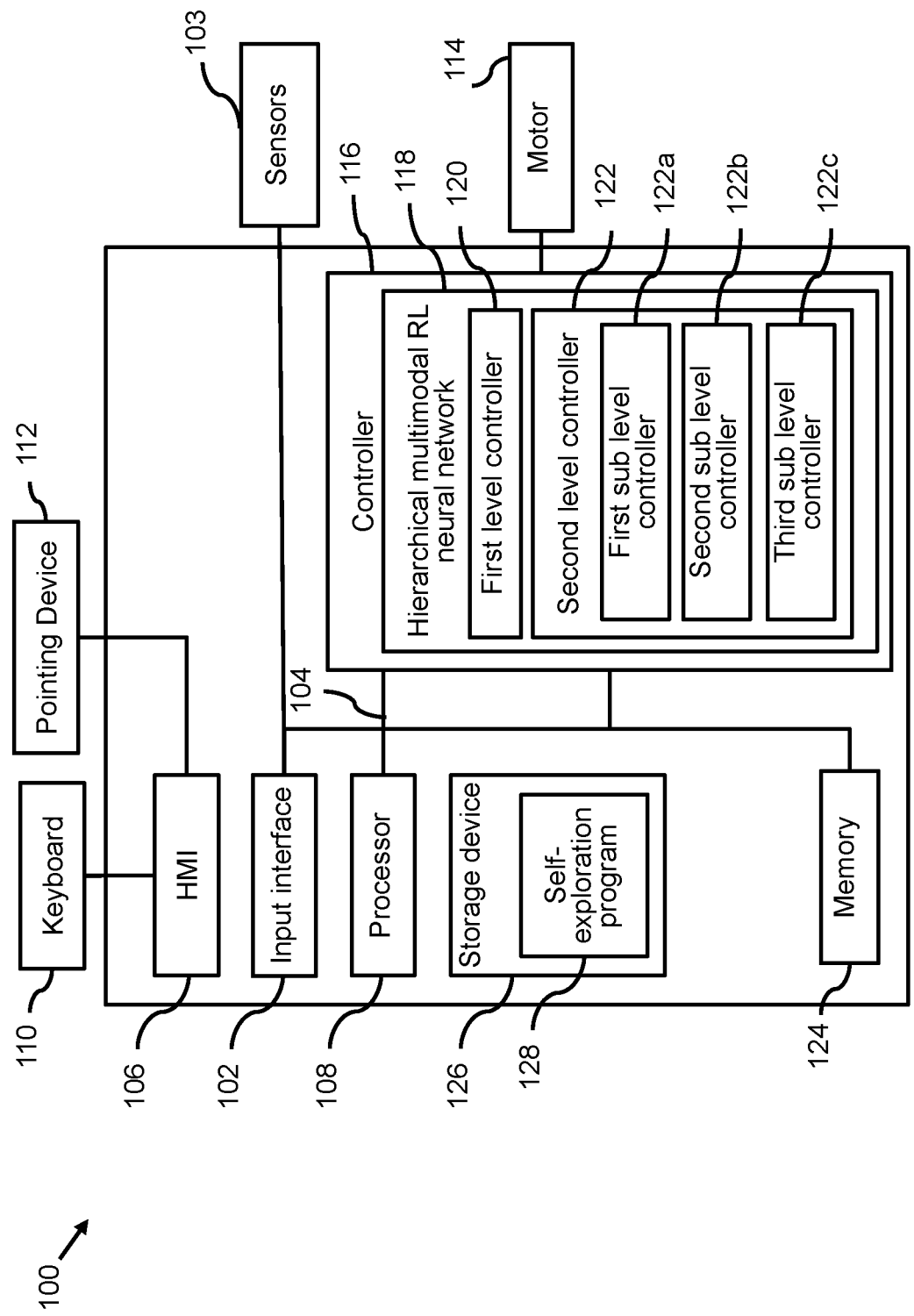
FIG. 1 illustrates a block diagram of a robot for performing an embodied navigation task, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

It is an object of some embodiments to disclose a bi-directional audio-visual-language embodied navigation (BI-AVLEN) technique that allows localization of an audio source in a realistic visual world. It is another object of some embodiments to disclose a BI-AVLEN method where an audio source is localized in a realistic visual world. It is another object of some embodiments to disclose a new type of hierarchical multimodal reinforcement learning (RL) neural network framework that jointly learns policies for a robot to decide when to query an oracle, how to query the oracle, how to navigate using audio-goal, and how to use natural language-based input data received from the oracle in response to the query. For clarity purposes only, some embodiments are described in relation to an audio-goal navigation operation. However, principles explained in relation to the audio-goal navigation operation with sporadic audio source may be used by alternative embodiments in other navigation applications.

FIG. 1 shows a block diagram of a robot 100 for performing an embodied navigation task, according to some embodiments. The robot 100 includes an input interface 102 configured to receive input data indicative for a motion of the robot 100. In an example, the input interface 102 may receive the input data form one or more sensors 103. For example, the sensors 103 may include imaging devices, such as camera, camcorder, etc., audio sensors, language sensors, and so forth. The input data may be used to transition a pose of the robot 100 from a start pose to a goal pose to perform a task, such as a navigation task. The input interface 102 may be further configured to accept an end-pose modification. The end-pose modification includes at least one or combination of a new start pose of the robot 100 and a new goal pose of the robot 100. In some embodiments, the input interface 102 is configured to receive input data indicative of visual and audio signals experienced by the robot 100 during the performance of the task. For example, the input data corresponds to multi-modal information, such as audio, video, textual, natural language, user input or validation, or the like. Such input data may include sensor-based video information received or sensed by one or more visual sensors, sensor-based audio information received or sensed by one or more audio sensors and, or a natural language instruction received or sensed by one or more language sensors. The input data may be raw measurements received from the one or more sensors 103 or any derivative of the measurements coupled with the robot 100 or installed within the robot 100, representing the audio and/or video information and signals.

In one embodiment, the robot 100 is a set of components, such as arms, feet, and end-tool, linked by joints. In an example, the joints may be revolutionary joints, sliding joints, or other types of joints. The collection of joints determines the degrees of freedom for the corresponding component. In an example, the arms may have five to six joints allowing for five to six degrees of freedom. In an example, the end-tool may be a parallel-jaw gripper. For example, the parallel-jaw gripper has two parallel fingers whose distance can be adjusted relative to one another. Many other end-tools may be used instead, for example, an end-tool having a welding tip. The joints may be adjusted to achieve desired configurations for the components. A desired configuration may relate to a desired position in Euclidean space, or desired values in joint space. The joints may also be commanded in the temporal domain to achieve a desired (angular) velocity and/or an (angular) acceleration. The joints may have embedded sensors, which may report a corresponding state of the joint. The reported state may be, for example, a value of an angle, a value of current, a value of velocity, a value of torque, a value of acceleration, or any combination thereof. The reported collection of joint states is referred to as the state.

The robot 100 may have a number of interfaces connecting the robot 100 with other systems and devices. For example, the robot 100 is connected, through a bus 104, to the one or more sensors 103 (described in detail in conjunction with FIG. 2A) to receive the new start pose and the goal pose via the input interface 102. Additionally or alternatively, in some implementations, the robot 100 includes a human machine interface (HMI) 106 that connects a processor 108 to a keyboard 110 and pointing device 112, wherein the pointing device 112 may include a mouse, trackball, touchpad, joystick, pointing stick, stylus, or touchscreen, among others. In some embodiments, the robot 100 may include a motor 114 or a plurality of motors configured to move the joints to change a motion of the arms and/or the feet according to a command produced according to a control policy. Additionally, the robot 100 includes a controller 116. The controller 116 is configured to execute control commands for controlling the robot 100. For example, the controller is configured to operate the motor 114 to change the placement of the arms and/or feet according to the control policy. The commands for the robot 100 are received from the controller 116 via the bus 104. For example, the state is received by the controller 116 via the bus 104, from the sensors 103. In an example, the bus 104 is a dedicated data cable. In another example, the bus 104 is an Ethernet cable. For example, the robot 100 may have to search for a semantic sounding object (shown in FIG. 2C). For example, instructions to navigate and reach the semantic sounding object may be part of a task description.

In accordance with present example, the controller 116 includes a hierarchical multimodal reinforcement learning (RL) neural network 118, which further includes a first level controller 120 and at least three second level controllers 122. For example, the at least three second level controllers 122 includes a first sub level controller 122a, a second sub level controller 122b, and a third sub level controller 122c. For example, the first level controller 120 may select one of the three second level controllers 122, i.e., one of the first sub level controller 122a, the second sub level controller 122b, and the third sub level controller 122c to perform a navigation interaction between the robot 100 and the environment within which the navigation task may be performed, one or more entity within the environment, and/or one or more entity associated with the navigation task. Such one or more entity may be, for example, an oracle. A manner in which the first level controller 120 selects one of the first sub level controller 122a, the second sub level controller 122b, and the third sub level controller 122c is described in detail in conjunction with the following figures.

It may be noted that references to a robot, without the classifications "physical", "real", or "real-world", may mean a physical agent or a physical robot, or a robot simulator which aims to faithfully simulate the behavior of the physical agent or the physical robot. A robot simulator is a program consisting of a collection of algorithms based on mathematical formulas to simulate a real-world robot's kinematics and dynamics. In the preferred embodiment the robot simulator also simulates the controller 116. The robot simulator may generate data for 2D or 3D visualization of the robot 100.

The robot 100 includes the processor 108 configured to execute stored instructions, as well as a memory 124 that stores instructions that are executable by the processor 108. The processor 108 may be a single core processor, a multi-core processor, a computing cluster, or any number of other configurations.

The memory 124 may include random access memory (RAM), read only memory (ROM), flash memory, or any other suitable memory systems. The processor 108 is connected through the bus 104 to one or more input interfaces and the other devices. In an embodiment, the memory 124 is embodied within the controller 116 and may additionally store the hierarchical multimodal RL neural network 118. The hierarchical multimodal RL neural network 118 may in turn embody the first level controller 120 and the three second level controllers 122, in an exemplar implementation.

The robot 100 may also include a storage device 126 adapted to store different modules storing executable instructions for the processor 108. The storage device 126 may also store self-exploration program 128 for producing training data indicative of a space of the environment within which the robot 100 may have to navigate. The storage device 126 may be implemented using a hard drive, an optical drive, a thumb drive, an array of drives, or any combinations thereof. The processor 108 is configured to determine a control law for controlling the plurality of motors to move the arms and/or the feet according to a control policy and execute the self-exploration program 128 that explores the environment by controlling the motor(s) 114 according to the learned control policy.

The robot 100 may be configured to perform the task, such as a navigation task for navigation of the robot 100 from the initial state of the robot 100 to a target state (such as a location of a semantic sounding object) by following a trajectory. The trajectory may be broken down into various sub-trajectories, representing various interactions of the robot 100.

As may be noted, the hierarchical multimodal RL neural network 118 includes the first level controller 120 and three second level controllers 122 comprising the first sub level controller 122a, the second sub level controller 122b and the third sub level controller 122c. In an embodiment, the second level controllers 122 may be configured with different modalities. For example, the first sub level controller 122a may relate to a first modality, the second sub level controller 122b may relate to a second modality, and the third sub level controller 122c may relate to a third modality. The first sub level controller 122a is configured to receive input data based on a set of predefined questions. In particular, the first sub level controller 122a relates to a query mode, wherein the robot 100 seeks navigation instructions from an oracle. Further, the second sub level controller is configured to receive the input data by generating a validation question based on a state of the hierarchical multimodal RL neural network 118. To this end, the second sub level controller 122b relates to a question or a validation mode, wherein the robot 100 generates the validation question to seek an answer from the oracle. It may be noted that the answer to the validation question received from the oracle may confirm or disapprove a belief of the robot 100, thereby reducing load on the oracle in generating the answer and reduced load on the robot required for natural language processing. As a result, better communication may be established between the robot 100 and the oracle.

Further, the third sub level controller 122c is configured to determine the input data based on the state of the hierarchical multimodal RL neural network 118. In this regard, the third sub level controller 122c relates to a goal-based modality, wherein the robot 100 takes audio, visual and/or textual cues from the environment as input data to perform the navigation task.

In an example, the first modality and the second modality relating to the first sub level controller 122a and the second sub level controller 122b may be free-form natural language based modality. To this end, corresponding input data received by the first sub level controller 122a and the second sub level controller 122b is in natural language. In this regard, the input data received by the first sub level controller 122a or the second sub level controller 122b is generated by an oracle. Moreover, the third modality of the third sub level controller 122c may be an audio or video based modality. To this end, the first sub level controller 122a, the second sub level controller 122b and the third sub level controller 122c may be configured with different policies based on the corresponding modality. Therefore, the first modality, the second modality and the third modality are different.

Pursuant to present example, the first level controller 120 uses a learned control policy (referred to as high-level policy, hereinafter) to determine when to select one of the three second level controllers 122—the first sub level controller 122a, the second sub level controller 122b, and the third sub level controller 122c. In one example, the first level controller 120 represents a directive for the robot 100 to decide what action it should take. In an example, the first level controller 120 may include a sequence of actions or states for the robot 100. In another example, the first level controller 120 configured with the high-level policy may be represented by a function that takes as input a robot state and provides the robot with an action to take. An action may represent values that should be applied to joints and parts of the robot 100 in order to move the robot 100 from one pose and state to another. For example, the high-level policy of the first level controller 120 may be deterministic, meaning that the high-level policy provides a single value for each movement of one or more parts of the robot 100. In an embodiment, the high-level policy takes as input a state and is represented by a neural network, such as the hierarchical multimodal reinforcement learning neural network 118. In another embodiment, the high-level policy may be represented by an analytical function, which takes as input a state. The high-level policy may be executed for a sequential number of time steps, which means that for a state at some initial time step $t_0$, the high-level policy provides the robot 100 with an action, which is then executed by the robot 100. The robot 100 will then have arrived in a new state at time step $t_1$. The high-level policy is then executed with the new state at time step $t_1$. This process may be repeated for a desired number of time steps, or the robot 100 receives an indication that the interaction (such as, for performing the navigation task partially or completely) has been completed. This repeated execution of the high-level policy may result in a trajectory followed by the robot 100 to execute the navigation task.

In operation, the first level controller 120 may select one of the three second level controllers 122 to perform a first interaction relating to a task, such as the navigation task. The first level controller 120 may select one of the first sub level controller 122a, the second sub level controller 122b, and the third sub level controller 122c based at least on the state of the hierarchical multimodal RL neural network 118. For example, the state of the hierarchical multimodal RL neural network 118 may indicate a current pose, location and/or configuration of the robot 100, a goal state of the first interaction, a goal state of the navigation task, and so forth. Further, the selected second level controller 122 may generate a control command based on the corresponding input data. As may be noted, the three second level controller 122 may have corresponding modality. Therefore, based a corresponding modality of the selected second level controller 122, the selected second level controller 122 may obtain the input data. Based on the input data, the selected second level controller 122 may generate the control command for moving the robot 100, for example, to partially navigate to perform the navigation task based on the first interaction. Thereafter, an operation of the robot 100 may be controlled by executing the control command. For example, the motor 114 of the robot 100 may be controlled based on the control command to cause the robot to navigate in order to complete the navigation task partially based on the first interaction.

Figure 2A:
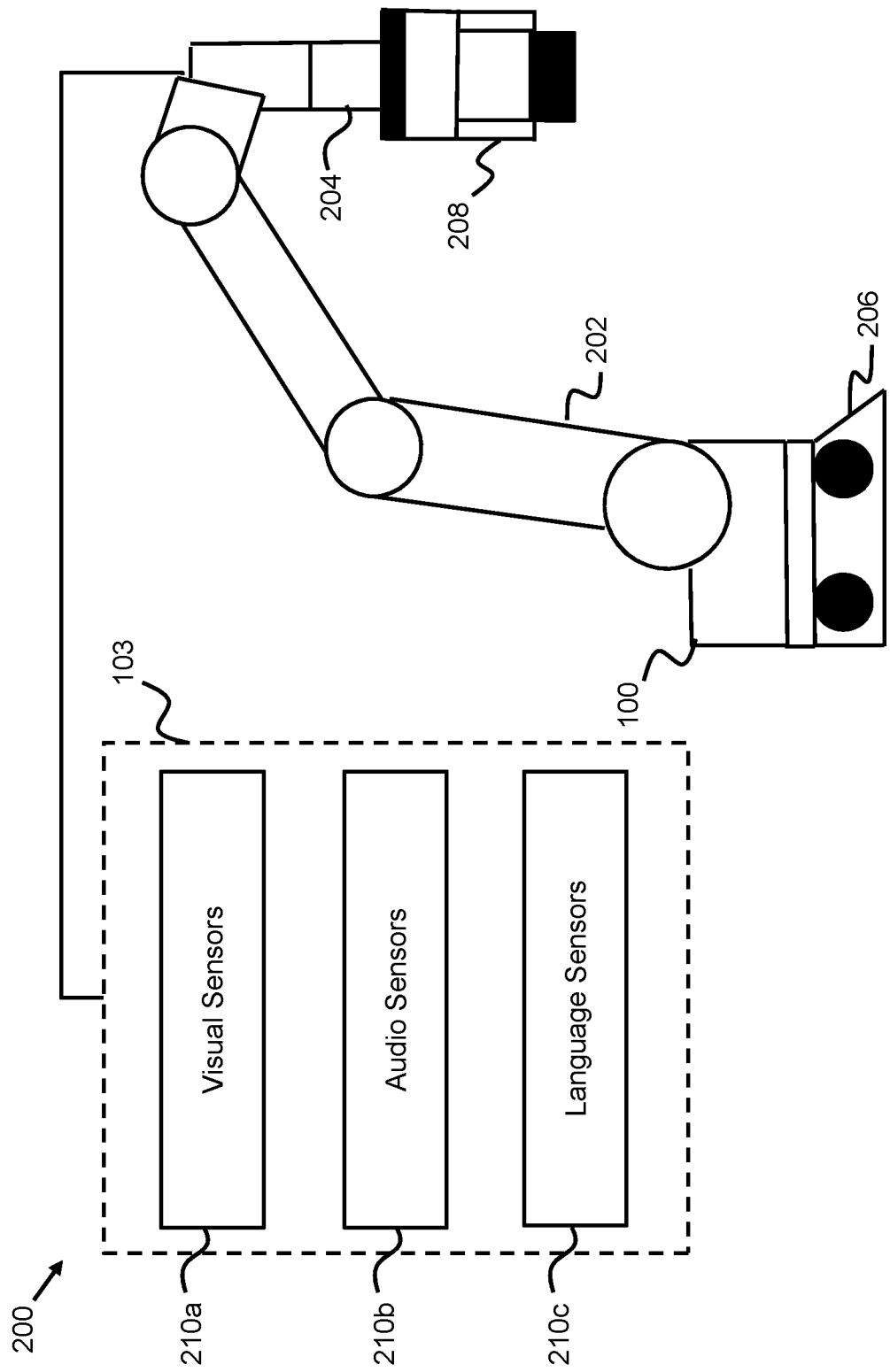
FIG. 2A illustrates a configuration of a robot, according to some embodiments of the present disclosure

FIG. 2A shows a configuration 200 of the robot 100, according to some embodiments. The robot 100 includes a locomotion device 202 for providing locomotion in the robot 100. In an example, the locomotion device 202 may include one or more motors 114 to provide locomotion. For example, the one or more motors 114 may include, but is not limited to, an electric motor, a hydraulic motor, and a pneumatic motor. The locomotion device 202 may provide power for movement or locomotion of arms 204, as well as feet 206 of the robot 100. For example, the arms 204 and the feet 206 may have multiple degrees of freedom for moving an object or the robot 100. In some implementations, the arms 204 are provided with an end-tool 208 for holding an object and/or for performing any other robotic operation, such as a search and rescue operation. The end-tool 208, for example, may be a gripper. Hereinafter, the 'end-tool' and 'gripper' may be used interchangeably.

According to an embodiment, an objective of a navigation task is to determine an audio source. In an example, the navigation task may include navigating through a rubble to look for trapped humans. For example, the rubble may be caused due to an earthquake. The robot 100 may use audio-visual cues, natural language instructions and/or validation responses to navigate through the rubble, as well as listens to an audio source or calls for help from trapped victims in natural language to navigate through the rubble. Such audio source may be sporadic or non-repetitive.

To this end, the representation of the robot 100 should not be construed as a limitation. In other embodiments of the present disclosure, the robot 100 may include other components, such as a body, one or more controllers, one or more sensors, end effectors, feedback devices, manipulators, and so forth.

Figure 2B:
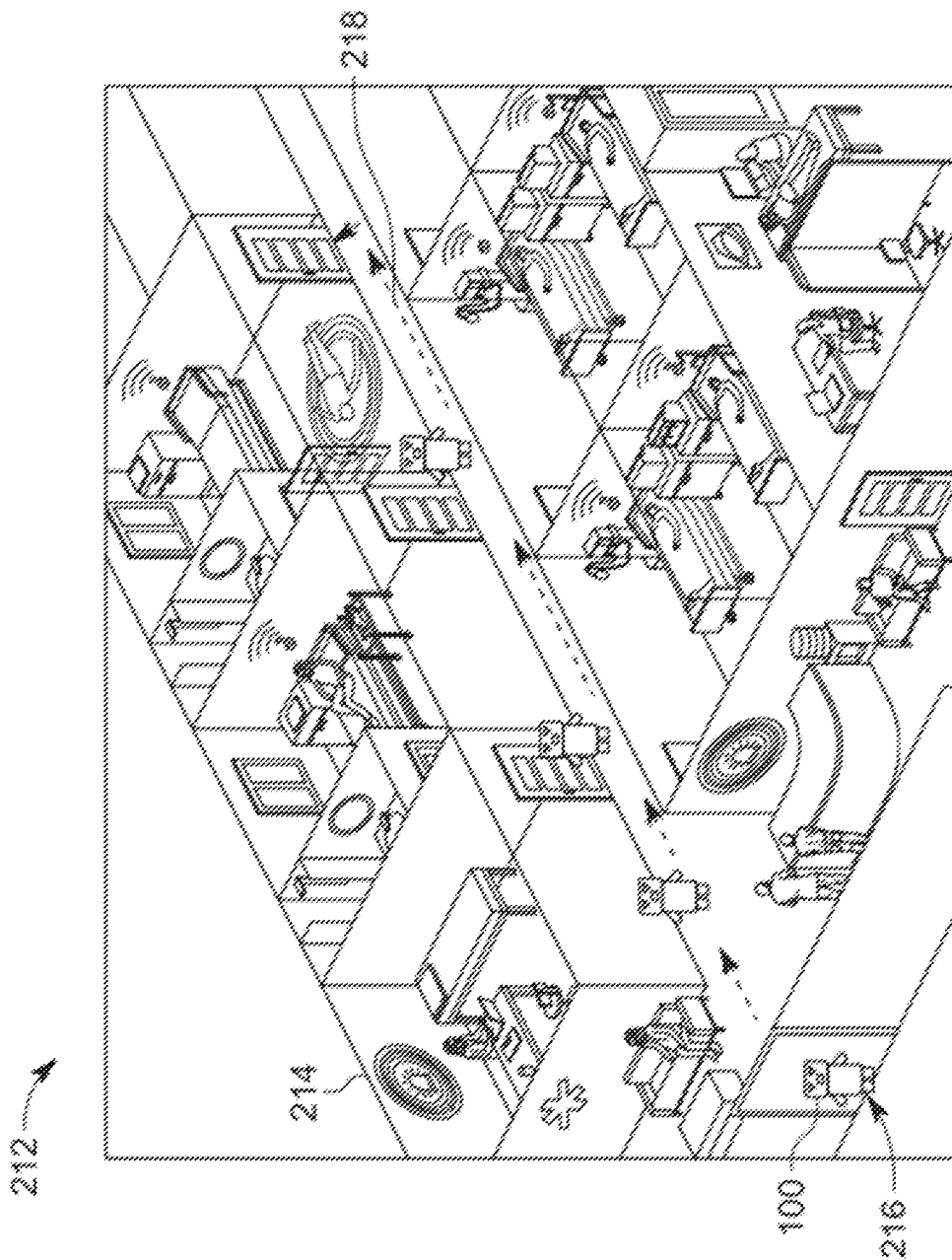
FIG. 2B illustrates an exemplar navigation task performed by a robot, according to some embodiments of the present disclosure.

FIG. 2B shows an exemplary navigation task 212 performed by the robot 100, according to an embodiment. FIG. 2B is explained in conjunction with the robot 100 as shown in FIG. 1 and FIG. 2A. The robot 100 is configured to perform a navigation task, e.g., navigate through a building 214 to find an audio source, for example, a patient to rescue or a window smashing due to storm to prevent property damage. As used herein, the audio source corresponds to a source emitting a sound. For example, the audio source may be a victim trapped in rubble, a patient in a hospital, a window making sound due to storm, and so forth. In a simple scenario, the audio source may be continuous or repetitive, i.e., an object may continue to emit an audio sound, such as window may keep smashing during the storm. However, in certain cases, the audio source may be sporadic or non-repetitive, i.e., the victim or the patient may only emit an audio sound, such as call for help, once. As the locomotion device 202 of the robot 100 includes multiple degrees of freedom, a movement of the robot 100 may comprise a motion profile spanning a three-dimensional space to search for the audio source.

The robot 100 may be initially at an initial location and is movable, in a start pose 216. A state of the robot 100 corresponding to the initial location and the initial pose 216 is referred to as an initial state of the robot 100. According to an embodiment, aim of the navigation task is to identify one or more audio sources inside of the building 214, wherein the one or more audio sources may or may not produce an audio sound continually. For example, the robot 100 is configured to move the arms 204 and the feet 206 along a trajectory 218 to navigate through the building 214.

A goal of the robot 100 is determined based on a location of an audio source, such as a call from a patient. At the end of a successful execution of the navigation task, a state of the robot 100 is considered to have attained a goal state of the robot 100. Therefore, achieving the goal state of the robot 100 is equivalent to successful execution of the navigation task, i.e., determining a location of the patient calling for help. According to an embodiment, the trajectory 218 is defined according to a start state and the goal state of the robot 100. Further, such navigation task may be executed repeatedly by the robot 100.

Considering the present embodiment, the robot 100 may need to navigate the never-seen-before building 214 (e.g., a hospital) to look for any patient seeking help. The robot 100 may need to use visual cues to navigate the building 214. Moreover, the robot 100 may also need to listen to ailing sounds or the calls-for-help from the patients. The robot 100 may further have to communicate and update a control station or a concerned person on the patient it found to guide rescue/recuperation efforts. In certain cases, the robot 100 may also seek help from other agents or human operators (referred to as oracle) for locating the patient when it cannot visually/auditorily-locate the source of sound. Therefore, some embodiments of the disclosure are based on the recognition that the robot 100 needs embodied autonomy as well as the capability for multimodal interaction.

In an aspect, embodiments of the present disclosure seek to address a problem relating to multitude of semantic levels for information relating to different modalities, due to which the robot 100 needs to know what information it needs to seek at which time for efficiently solving its mission. For example, if a sound is not clearly audible, the robot 100 may seek assistance from a remote operator for suggestions on where or which direction to focus the search in. However, the provided operator instructions could be in natural language, and thus the robot 100 needs to clearly decipher it to make navigation commands out of these instructions. Subsequently, for deciphering the natural language instructions, a task may have to be performed that involves reasoning at a higher semantic level.

Some embodiments are based on a recognition that the goal state of the robot 100 involved in the navigation operation may vary between the repetitions of the navigation operation. For example, in case the robot 100 listens or senses a sound from an audio source, such as from a patient, the robot 100 may begin the navigation operation to identify the audio source and identify a location of the patient. For example, the audio sound may be in natural language, sporadic and/or non-repetitive.

Some embodiments are based on the recognition that the robot 100 may generate the trajectory 218 in parts to navigate through the building 214. For example, the robot 100 may break down the task of navigating through the building 214 to find the patient based one or more interactions. In this regard, completion of a first interaction from the one or more interactions may correspond to generation or a first part of the trajectory 218 and navigation of the robot 100 on the first part. Once the first interaction is performed, the robot 100 may perform a second interaction to generate a second part of the trajectory 218.

To that end, referring back to FIG. 1, the robot 100 may generate the trajectory 218, specifically, the parts of the trajectory 218, based on the environment, i.e., sensor data received from one or more sensors 103 in the environment.

In an example, the robot 100 may include one or more visual sensors 210a, one or more audio sensors 210b, and one or more natural language sensors 210c (shown in FIG. 2A). For example, the visual sensor 210a may be a camera, and the audio sensor 210b may be a microphone. For example, the robot 100 may perceive visual and audible information around it to formulate the first interaction. However, in certain cases, the robot 100 may fail to navigate through the building 214 based only on sensor data corresponding to goal estimate, i.e., sensor data relating to environment of the robot 100. Subsequently, the robot 100 may require input in another modality, such as a natural language audio or visual input, to formulate interactions, parts of the trajectory 218 and generate the trajectory 218 completely to reach the goal state.

To this end, some embodiments are based on the recognition that the robot 100 may not know when to query an oracle in an environment, such as the building 214, to receive natural language input. Some embodiments are also based on the recognition that the robot 100 may not know how to query the oracle in order to ensure that load on the oracle is less while answering to the robot as well as better communication exists between the oracle and the robot 100. Some embodiments are also based on the recognition that the robot 100 may not know how to navigate through the building 214 based on the audio sensors 210b and visual sensors 210a. Some embodiments are also based on the recognition that the robot 100 may not know how to use natural language instructions, i.e., natural language modality, along with other sensor based instructions, i.e., audio, and visual modalities.

Figure 2C:
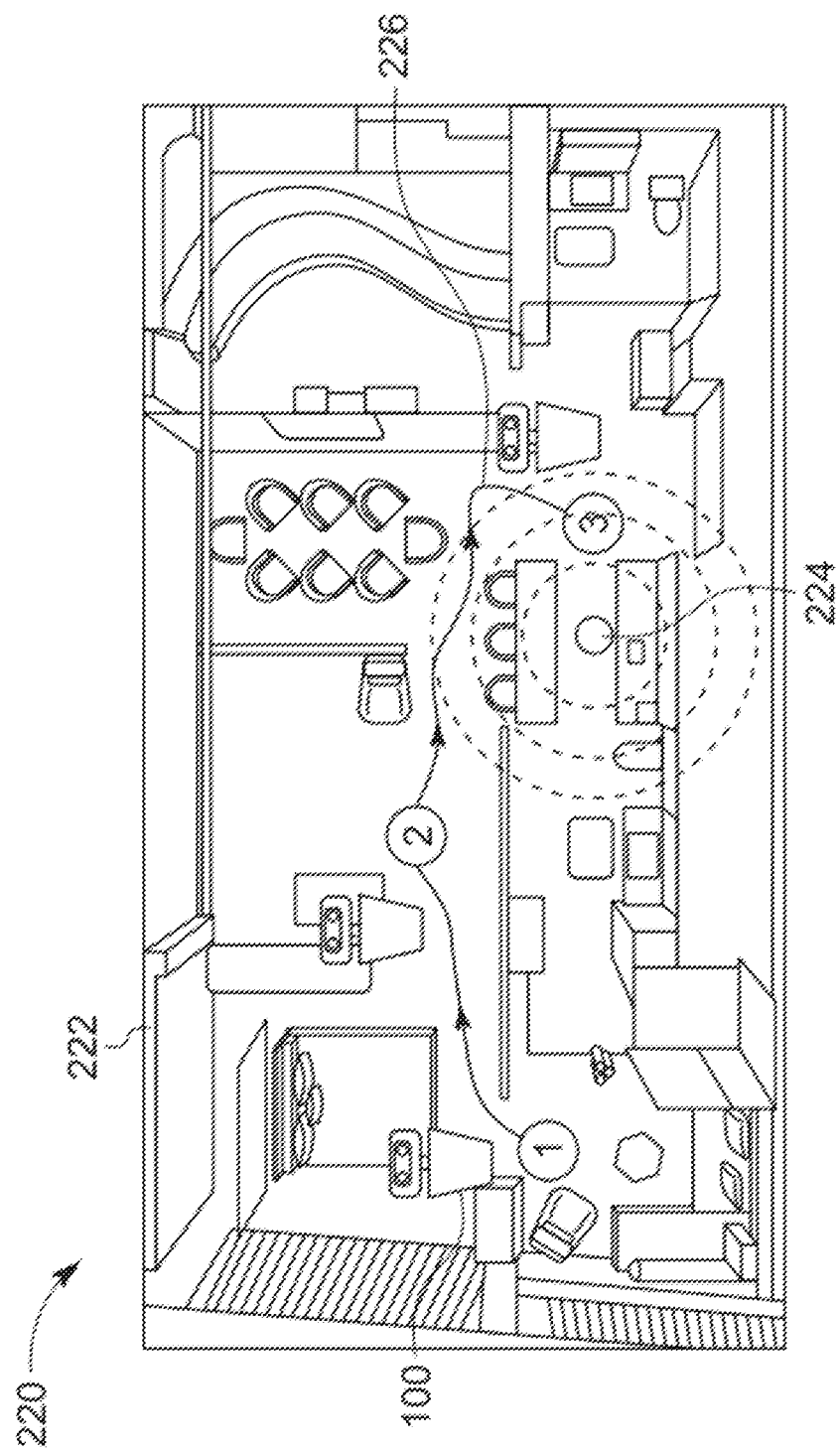
FIG. 2C illustrates an exemplar navigation task performed by a robot based on different modalities, according to some embodiments of the present disclosure.

FIG. 2C shows an exemplary navigation task 220 performed by the robot 100 based on different modalities, according to some embodiments. FIG. 2C is explained in conjunction with the robot 100 as described in FIG. 1. FIG. 2B and FIG. 2C. The robot 100 is required to navigate in an unseen 3D room environment 222 to find a semantic sounding object 224. It may be noted that the sound emitted by the semantic sounding object 224 may be sporadic or short of duration.

The objective of the robot 100 is to learn a multi-modal hierarchical RL policy $\pi: R^{|S|} \times A \rightarrow [0, 1]$ that maximizes the expected return defined by the value function $V^\pi$, while minimizing a total number of times the robot 100 selects QueryOracle or invokes AskQuestion that leads to a negative response from the oracle. The action space at every time step is given by:

A={stop, move forward, turn right, turn left}.

In an example, a task to be performed by the robot 100 may be specified by $(O_0, g)$, where $O_0$ is the initial observation and g is a feature descriptor of a goal to reach (such as a neural encoding of sound heard by the robot 100). The goal may correspond to the location of the semantic sounding object 224. A densely sampled grid of N locations of 1 m resolution may be used as a navigation graph for navigation of the robot 100. As described above, the robot 100 is equipped with visual sensors 210a, such as camera or ego-centric RGBD camera, and audio sensors 210b, such as microphone or binaural microphone, to perceive visual and audible information around it. In one example, the navigation task (particularly, a BI-AVLEN task) may be formulated as a partially observable Markov decision process (POMDP) characterized by a tuple (S, A, T, R, O, P, V, γ), where S represents a set of robot states, A=A∪{QueryOracle, AskQuestion} represents a set of actions the robot 100 can take, with A denoting the navigation actions defined above, combined with two natural language-based interaction options to either QueryOracle, i.e., query the oracle directly for navigation instruction and AskQuestion, i.e., to pose a validation question. T(s'|s, a) represents a transition probability for mapping a state-action pair (s, a) to a destination state s', while R(s, a) represents an intermediate reward received for taking an action a in a state s. O denotes a set of environment observations, P (o|s', a) represents a likelihood of observing o∈O in a new state s' after taking the action a, and γ∈[0, 1] is a reward discount factor for trajectories that have a long horizon.

The POMDP may also include a dictionary D having a vocabulary of a set of words used by the robot 100 to ask a question or for the oracle to provide natural language instructions. As the BI-AVLEN robot 100 operates in a partially observable setup, the robot 100 may maintain a belief distribution b over S as an estimate of its current state. Using the belief distribution, an expected reward attributable to an action a at a given belief state b may be written as:

$R'(b,a) = \Sigma_{s \in S} b(s) R(s,a)$

As may be understood, the task of the robot 100 is to perceive the audio and navigate from a start location towards the object 224 that emits the sound (Audio-Goal), where the sound is assumed to be produced by a static and semantically unique object 224, but may be new voice from a new source, new information produced by the audio goal, intermittent or mixed up with other sound from varied sources. The robot 100 may call a stop action only when it considers the goal is reached and the navigation task terminates.

Pursuant to examples of the present embodiment, the robot 100 may ask questions to an oracle and receive input data. In one example, when the robot 100 asks a validation question, the oracle may either give "yes" response if the oracle's interpretation of the validation question in its own state space matches the ground truth geodesic to the goal, otherwise responds with a "no" followed by a short instruction guiding the robot 100 to the reach the sounding object 224 (or the audio source or goal). In another example, when the robot 100 may not know how to frame a question, the robot 100 may ask an open-ended question and interact with the oracle to directly receive navigation instructions. A number of times the robot 100 may receive the validation response and/or the direct navigation instructions from the oracle (as a result of a wrong question or when it queries) is limited by a budget so that the robot 100 only seeks help when its navigation uncertainty is high. For example, the budget may specify a limit on a maximum number of interactions allowed between the robot 100 and one or more oracle in the environment 222.

It may be noted that if the oracle responds to a validation question with a 'yes', i.e., positive validation, then the interaction between the oracle and the robot 100 is not counted towards interaction budget as it incurs minimal effort from the oracle. In other words, when the oracle's interpretation of the validation question in its own state space matches the ground truth geodesic to the goal, then such interaction may not be counted towards the budged or the budget may be very minimal.

After an interaction between the robot 100 and the oracle, the robot 100 receives natural language instruction or a validation response from the oracle. In an example, the natural language instruction or the validation response enables generation of a path segment along a shortest path trajectory 226 for the robot 100 to navigate towards the goal, i.e., the semantic sounding object 224. In an example, the natural language instruction provided by the oracle is, for example, 'go around the sofa and take a left'. Alternatively, the robot 100 may ask the validation question as "Should I go around the sofa and take a left—Yes or No?", wherein the oracle may reply with a "Yes" to assist the navigation of the robot 100.

Although the natural language instruction may be a single instruction or the validation question may have a single instruction, however, a ground truth trajectory corresponding to the natural language instruction or the validation would be a series of instructions such as 'move forward', 'move forward', 'turn right', 'turn right', 'turn left'. For example, a ground truth trajectory may be a short segment extracted from the ground truth trajectory 226 that goes from a current location, depicted as number '1' and pose of the robot 100, such as an initial state, towards the goal, depicted as number '3', via an intermediate location depicted as number '2'. At any point in the navigation process, the robot 100 may utilize either audio-based navigation, language-based navigation (QueryOracle), or validation question-based navigation (AskQuestion) to find an action distribution in the action space.

To this end, an objective of the robot 100 while performing the navigation task may be formulated as:

$$\arg\max_\pi V^\pi(b_0), \quad (1)$$

wherein $$V^\pi = \mathbb{E}\left[\sum_{i=0}^\infty \gamma^i(R'(b_{t+i}, a_{t+i}) - P(t))\right],$$

$$P(t) = \zeta_1(t+1)I_1(t) + \zeta_2(t+i, M(t))I_2(t),$$

$$I_1(T) = \mathbb{I}(a_{t+i} = \text{QueryOracle} \mid b_t = b, \pi),$$

$$I_2(t) = \mathbb{I}(a_{t+i} = \text{AskQuestion} \mid b_t = b, \pi),$$

$$M(t) = \mathbb{I}(H(q(t+i)) = GT(t+i)),$$

where $\mathbb{I}$ is an indicator function, while the updated belief $b_{t+1}$=update $(o_{t+1}, b_t, a_t)$ is defined for state s' as: $b_{t+1}(s') = \eta P(o_{t+1}|s', a_t)\Sigma_{s \in S} b_t(s)T(s'|s, a_t)$ for a normalization factor $\eta > 0$. The functions $\zeta_1, \zeta_2$: $\mathbb{R}_+ \to \mathbb{R}_+$ capture the penalty intended to limit the number of times the oracle is queried. Note that $\zeta_2$ takes M(t) as input, to check whether the validation question being asked matches or not and decides a value of the penalty. M(t) is an indicator function that checks whether the validation question q asked by the robot 100 can be followed by the oracle H to produce the ground truth actions given by GT (i.e., the oracle's geodesic).

As the action space A of the robot 100 can quickly grow, to keep computations tractable, a history of past K step observations may be developed in a memory module M. At any step in the trajectory 226, the robot 100 receives a partial observation of the environment 222 (i.e. visual modality, an audio waveform or audio modality). Both the modalities, i.e., visual and audio, need to be encoded to be used in inference pipeline. At time step t, the observation of the robot 100 consists of $O_t$=$F_t^V$, $F_t^B$, $F_{t-1}^A$, $P_t$, where $F_t^V$ is an egocentric visual observation consisting of an RGB and a depth image, $F_t^B$ is a Short-Time Fourier Transform (STFT) spectrogram representation of a binaural audio waveform, $P_t$ is pose of the robot 100, and $F_{t-1}^A$ is a previous action taken by the robot 100. In an example, separate encoders may be used for visual and audio observations. For example, the memory module M is used to store history information in an embedded form. The memory module M stores observation embedding of each step separately. Initially, the memory module M starts from an empty set. At a time step t, the memory module M stores, M={$e_i^O$: i=max {0, t-$s_M$}, ..., t}, where $s_M$ is memory size and $e_i^O$ is observation encoding. In an example, a goal estimation network is a convolutional neural network (CNN) $f_g$ and the estimate $\hat{g}_t$=$f_g(B_t)$ is the stepwise estimate of the semantic sounding goal 224. The estimate may include two parts: (i) the goal location, and (ii) the goal category. Some embodiments are based on a recognition that the robot 100 aggregates a current goal estimate with a previous goal estimate as $g_t$=$(1-\lambda)$ $\hat{g}_t$+$\lambda f_p(g_{t-1}, \Delta p_t)$. When the sound is turned off, $\lambda$=1, which means the current goal estimate would be the update of the previous goal estimate. It may be noted that the term "goal estimate" is used interchangeably as "goal descriptor".

Some embodiments are based on the recognition that communication among humans is conveyed closely with different modalities of information (such as visual information and audio information) about surrounding objects and events. For machines, such as the robot 100, to converse with the oracle, such as a human, about the navigation task, multi-modal reasoning is required. The multi-modal reasoning is utilized to generate effective models of dynamic audio-visual scenes. The robot 100 may infer about the search operation based on the modalities and generate responses to query from the oracle. In an example, such multi-modal query may be formalized through audio visual scene aware dialog (AVSD) system. Some applications of the AVSD system include end-to-end dialogs, visual question answering (VQA), and video captioning. The AVSD system may be used for supporting conversations between the oracle and the robot 100. To support the conversations, the AVSD system requires ability to model audio-visual scenes and previous dialog context using multi-modalities (such as audio, video, query, and multi-turn dialog history) jointly, and to generate responses in free-form natural language. To this end, computational resources may be required to model queries in natural language. For example, the robot 100 may have a set budget, and therefore, the robot 100 may require a policy to decide when to query the oracle based on the budget. Moreover, the modalities like natural language and video (or audio) information are required for the AVSD task. The video may be independent of the natural language and sometimes the natural language information and the audio information may contain similar information. Some embodiments are based on a recognition that the robot 100 needs to extract relevant information from the natural language to use the information from the natural language.

In certain cases, the objective of the robot 100 formulated using the equation (1) may form a trajectory to be followed by the robot 100 for performing the navigation task. For example, the trajectory may include sub-goals. The trajectory may include a temporal sequence of actions that the robot 100 may take for completing the navigation task. The trajectory may be a collection of discrete points. At various time steps along the trajectory, the sub goals may occur.

In an example, the sub goals are generated by a neural network which takes as input, the initial state, the goal state, the current state and environment information relating to the robot 100. In an embodiment, a number of sub goals are predetermined by a human operator. In another embodiment, the number of sub goals may be learned by analyzing a predicted trajectory or an audio sound, such as from the semantic sounding object 224. For example, the sub goals may be set based on input data received by the robot 100. As mentioned above, the input data may be from several modalities, such as audio, video, natural language, and so forth. The robot 100 may receive a new input data upon completing a sub goal. Based on the new input data and the previous sub goal, the robot 100 may determine a next sub goal. In this regard, each of the sub-goals may correspond to a segment of the trajectory that the robot 100 may have to navigate to complete a task, such as the navigation task for search and rescue operation, for example, to reach the semantic sounding object 224. In order to reach a sub goal, the robot 100 may have to perform a corresponding interaction. In an example, the robot 100 performs one or more interactions in a hierarchical manner. The hierarchical manner in which the interactions are performed is described in FIG. 3.

FIG. 3 shows an example method 300 for performing a navigation task using the hierarchical multimodal RL neural network 118, in accordance with an embodiment. In an example, the navigation task is to be performed for navigation of the robot 100 from an initial state till a target state. For example, with regard to the environment 222, the initial state may correspond to a starting pose and a starting state of the robot 100, and the target state corresponds to a goal pose and goal state of the robot 100. In particular, the target state may be associated with a location of the semantic sounding object 224.

It may be noted that the robot 100 is equipped with the ability to interact with an oracle in the environment 222 and receive natural language feedback. The robot 100 is required to break down the task into multiple interactions. The robot 100 performs the multiple interactions, e.g., navigate based on a goal estimate or goal descriptor, decide when to query the oracle, decide how to query the oracle, and determine a control command if queried based on the natural language instruction. In an example, the robot 100 may utilize the hierarchical multimodal RL neural network 118 to perform the multiple interactions. The method describes use of the hierarchical multimodal RL neural network to train a robot 100, to learn how to perform the task, or an interaction for the task, in an effective manner.

Reinforcement learning (RL) is an area of machine learning concerned with how software agents, entities or controllers ought to take actions in an environment to maximize some notion of cumulative reward. An RL agent interacts with its environment in discrete time steps. At each time t, the RL agent receives an observation $o_t$, which typically includes a reward $r_t$. RL controller then chooses an action $a_t$ from a set of available actions to increase the reward, which is subsequently sent to the environment.

It may be noted that several possibilities may exist towards designing the end-to-end hierarchical multimodal RL neural network 118. For example, one may use a single controller that decides whether to query the oracle or take a navigation step either based on the goal estimate or based on received instruction. However, there is a distinct difference between performing different types of interactions to complete a main navigation task successfully and efficiently. Performing these interactions in diverse manner using a single state space and single controller would be difficult to achieve and will result in sub-optimal performance. To alleviate the above challenge, the whole navigation task may be performed using three types of interactions that may use independently abstracted state spaces. This division of performing a high-level task based on three different types of interactions and then using the RL based neural network to perform the navigation task is the core of the hierarchical multi-modal RL neural network 118 described in this disclosure. To that end, the hierarchical manner for solving the navigation task is illustrated in FIG. 3 to decide when to query the oracle and how to make a navigation step either based on the goal estimate or based on a received instruction from the oracle.

At 302, three second level controllers 122 are retrieved or triggered (interchangeably meaning the same) to be used to perform a navigation task. In an example, the three second level controllers 122 may include the first sub level controller 122a, the second sub level controller 122b and the third sub level controller 122c. In an example, the first sub level controller 122a may be configured with a first policy, the second sub level controller 122b may be configured with a second policy and the third sub level controller 122c may be configured with a third policy. For example, the first policy may relate to a first modality, the second policy may relate to a second modality and the third policy may relate to a third modality.

As described above, the first sub level controller 122a and the second sub level controller 122b may be associated with free-form natural language modality. To this end, the first policy and the second policy may relate to a natural-language-based modality, and the third policy may relate to an audio modality, a video modality, a text modality, or other goal-information based modality.

According to an example implementation of the embodiments of the present disclosure, the first sub level controller 122a may have a free-form natural language based modality that may perform interactions based on natural language instructions received from an oracle. In particular, the first policy may query the oracle in a query mode to seek partial navigation instructions for completing an interaction based on a set of predefined questions. The set of predefined questions may be open-ended questions, for example, "Where should I go?", "Help", "I am lost", "How do I reach a location", and so forth. It may be noted that such set of predefined questions are only illustrative and should not be construed as a limitation. In particular, the first sub level controller 122a may select a relevant question from the set of predefined questions and query the oracle. The first sub level controller 122a may receive a natural language or vision based instruction from an entity, such as the oracle. Based on received input data from the oracle in response to the query, the first sub level controller 122a may generate a control command for completing a part of the navigation task.

Further, the second sub level controller 122b may have a free-form natural language based modality that may perform interactions based on a natural language user input received from an oracle. In particular, the second sub level controller 122b may question the oracle in a question mode by generating a validation question having one or more possible answers to receive a selection from the one or more possible answers for completing an interaction. Examples of the validation question may include, but are not limited to, "Should I go ahead towards the door?", "Should I take a right from here?", and "Which direction is the hallway in?". It may be noted that such validation questions are only illustrative and should not be construed as a limitation. In an example, the second sub level controller 122b may generate the validation question based on analyzing a current state of the robot 100, state of the hierarchical multimodal RL neural network 120, goal state of the robot 100 and navigation environment. Based on the validation question, an entity, such as the oracle may provide a selection of an answer, such as a selection between "Yes or No", a selection between "Right or Left", a selection between "Right or Wrong", and the like. Based on the user input, the second sub level controller 122b may generate a control command for completing a part of the navigation task.

The third sub level controller 122c may have a vision-and-audio based modality. In this regard, the third sub level controller 122c configured with the third policy may be configured to perform an interaction relating to the navigation of the robot 100 to an audio goal with the environment 222 in which the robot 100 may have to navigate, for example, based on audio and/or video sensor based input data.

It may be noted that such an example of the first policy and the second policy being natural language based policy and the third policy being an audio-goal policy is only exemplary and should not be construed as a limitation. Thus, retrieving any of the three second level controllers 122 is equivalent to the controller 116 using the first level controller 120 to select one of the three second level controllers 122.

Continuing further with the present example, the first policy, i.e., the vision-and-language query policy, $\pi_l$, the second policy, i.e., the vision-and-language question policy, $\pi_{ques}$, and the third policy, i.e., the audio and video-goal policy, $\pi_g$, are employed by the independent controllers, i.e., the first sub level controller 122a, the second sub level controller 122b and the third sub level controller 122c, respectively. The first policy, the second policy and the third policy may correspond to navigation policies. The first policy or the vision-and-language query policy, $\pi_l$, is the policy to utilize audio, textual and/or visual natural language instruction provided by the oracle for navigation. The second policy or the vision-and-language question policy, $\pi_{ques}$, is the policy to utilize a state of the hierarchical multimodal RL neural network 118, state of the robot 100 and/or environment state to generate a validation question and utilize an audio, textual and/or visual natural language validation response provided by the oracle for navigation. The third policy or the audio and video-goal policy, $\pi_g$, denotes the audio or video based navigation policy that utilizes audio or video sensor data corresponding to the goal estimate and the current state of the robot 100 for navigation. The three second level controllers 122 may compute a distribution over an action space A based on a performed interaction between the robot 100 and the environment 222 and/or the entity associated with the navigation task.

However, the robot 100 faces a challenge to decide when to select which second level controller, i.e., when to use which policy.

At 304, the first level controller 120 configured with a high-level policy, $\pi_s$, acts as a gating policy for selecting one of the three second level controllers 122, i.e., the first sub level controller 122a having the first policy $\pi_l$, the second sub level controller 122b having the second policy $\pi_{ques}$ and the third sub level controller 122c having the third policy $\pi_g$. In this regard, the first level controller 120 uses the high-level policy, $\pi_s$. For example, the first level controller 120 may select one of the three second level controllers 122 for performing a first interaction associated with the navigation task.

In an example, the first level controller 120 computes a distribution over the selection of the first sub level controller 122a, the second sub level controller 122b and the third sub level controller 122c. Based on the selection of one of the first sub level controller 122a, the second sub level controller 122b and the third sub level controller 122c, a corresponding low-level policy from the selected second level controller 122 may be retrieved. The first level controller 120 may have a policy learning network trained using reinforcement learning to determine when to select one of the three second level controllers 122 or the three low-level policies.

In an example, the first level controller 120 may compute the distribution to select the low-level policy based on a belief state and goal information. In this manner, the first level controller 120 decides when to query the oracle, i.e., when to select one of the first sub level controller 122a and the second sub level controller 122b, and how to query the oracle in a most effective manner, i.e., query using a predefined question in the query mode or a using a validation question in the question mode. Note that by using such a two-stage policy, the high-level policy, $\pi_s$, configured on the first level controller 120 and the low-level policy configured on the selected second level controller 122, the robot 100 learns to implicitly combine the uncertainty in the audio-visual cues and the learned uncertainty of reaching the goal state via choosing one of the second level controllers 122 towards deciding when the robot 100 should make a query and how fruitful that query will be.

At 306, the selected second level controller 122 performs the first interaction associated with the navigation task. In this regard, low-level policy configured on the selected second level controller 122 may be triggered to interact and obtain input data by querying the oracle or from the environment 222.

In an example, the selected second level controller 122 may acquire or receive input data and a state of the hierarchical multimodal RL neural network 118. For example, the input data may include sensor measurements or signals captured from the environment 222, such as audio signal, video signal, or vision-based natural language instruction, audio-based natural language instruction, an audio-based natural language validation response, a video-based natural language validation response, text or user input-based validation response, and so forth. Further, the state of the hierarchical multimodal RL neural network 118 comprises at least one of: a set of state variables associated with the state of the hierarchical multimodal RIL neural network 118 or a current belief state of the hierarchical multimodal RL neural network 118.

Herein, at least one of: the input data or the state of the hierarchical multimodal RL neural network 118, as used by the first sub level controller 122a relating to the first modality, the second sub level controller 122b relating to the second modality, and the third sub level controller 122c relating to the third modality, are different. In other words, the first sub level controller 122a relating to the first modality may obtain a type of input data, for example, partial navigation instructions in natural language, and a first set of parameters of the state of the hierarchical multimodal RL neural network 118. Further, the second sub level controller 122b relating to the second modality may obtain a type of input data, for example, an audio, video, touch or text based validation response and a second set of parameters of the state of the hierarchical multimodal RL neural network 118. Moreover, the third sub level controller 122c relating to the third modality may obtain a type of input data, for example, sensor-based audio or video data from the environment 222 and a third set of parameters of the state of the hierarchical multimodal RL neural network 118.

Based on performing the first interaction, the selected second level controller 122 configured with the corresponding low-level policy may generate a set of control instructions for navigation of the robot 100 from a starting state to a new state. The starting state may correspond to the initial state or a goal state from a previous interaction. Similarly, the new state may correspond to an intermittent state between the initial state and the goal state of the navigation task. It may be noted that the navigation task may be considered to be completed at the goal state.

In an example, the first sub level controller 122a may relate to a natural language-based modality. In such a case, the first sub level controller 122a, when selected, is configured to determine the control command based on natural language instructions received from the oracle in the environment 222. For example, the first sub level controller 122a may query the oracle for directly receiving navigation instructions using an open-ended question from a set of predefined questions, and the oracle may provide the input data in natural language. Further, the second sub level controller 122b may relate to a natural language-based modality. In such a case, the second sub level controller 122b, when selected, is configured to determine the control command based on a validation response received from the oracle in the environment 222. For example, the second sub level controller 122b may generate a validation question by analyzing a state of the hierarchical multimodal RL neural network 118 and/or state of the robot 100 to query the oracle for receiving the validation response, and the oracle may provide the input data as a natural language validation response to confirm or disapprove the validation question. Further, the third sub level controller 122c may relate to an audio or video goal-based modality. In such a case, the third sub level controller 122c, when selected, is configured to determine the control command based on audio and/or video information obtained by sensors in the environment 222. Based on the control command, the selected sub level controller controls the navigation of the robot 100.

FIG. 4 shows an example method 400 for controlling the robot 100 using the controller 116, in accordance with an embodiment. In an example, the robot 100 may have a plurality of parts connected to each other through one or more joints. For example, the robot 100 may have feet 206, arms 204, a body, a head, or any other part. Further, the robot 100 may have software agent installed thereon. The software agent may run on the controller 116 of the robot 100 to carry out tasks assigned to the robot 100. In one example, a goal description may be based on an audio sound from an audio source. In this regard, the goal may be to perform a search and rescue operation for the audio source. Subsequently, the goal may include navigation of the robot 100 to the audio source to complete the search and rescue operation.

The method is performed using a multi-modal hierarchical RL neural network 118 that performs multiple interactions associated with the navigation task and control the robot 100. The controller 116 may include the first level controller 120 and the second level controllers 122. The second level controllers 122 may include the first sub level controller 122a, the second sub level controller 122b and the third sub level controller 122c. Subsequently, the first policy relating to a first modality configured on the first sub level controller 122a, the second policy relating to the second modality configured on the second sub level controller 122b, and the third policy relating to a third modality configured on the third sub level controller 122c are different. In an example, the first modality relating to the first sub level controller 122a is a natural language-based query modality, the second modality relating to the second sub level controller 122b is a natural language-based validation or question modality, and the third modality relating to the third sub level controller is an audio or video goal-based modality for reaching the goal estimate. It may be noted that the number of second level controllers 122 to be three is only exemplary and in other embodiments of the present disclosure, any number of second level controllers 122 may exist. For example, the number of second level controllers 122 may be based on a number of modalities that can be interpreted by the robot 100.

Continuing with the present embodiment, the present disclosure discloses multimodal interaction between the robot 100 and the environment 222 having an oracle. In one example, the oracle may be a human. To this end, the robot 100 may be configured to interact with the environment 222 to obtain goal based measurements, such as sensor readings, or interact with the oracle in the environment 222 using natural language. Based on the interaction with the environment 222, a natural language instruction, a natural language validation or sensor measurements may be obtained.

As may be understood, multimodal interaction refers to the interaction with the virtual and physical environment through natural modes of communication. In other words, multimodal interaction enables more free and natural communication, interfacing users with automated systems in both input and output. Specifically, multimodal systems may offer a flexible, efficient and usable environment allowing users, such as the oracle, to interact through input modalities, such as speech, handwriting, hand gesture, touch. In certain cases, when the oracle may not be present in the environment 222, other goal-based sensor data may be acquired from the environment 222. Then a multimodal system, i.e., the robot 100 has to recognize the inputs from the different modalities and combine them according to temporal and contextual constraints in order to allow their interpretation. The input is processed and interpreted by the controller 116 to perform the search operation or any other navigation task. In accordance with the present disclosure, the neural network 118 is trained based on reinforcement learning.

As may be understood, BI-AVLEN is a complex task that demands a tight coupling between various modalities (including RGB images, depth maps, binaural audio, and free-form natural language) for effective reasoning and efficient navigation. The different modalities inhabit distinct levels of semantic granularity. Specifically, for the robot 100 to navigate or perform a task, it needs to have commands provided to its motor 114 and actuators. However, these commands could be either produced by mapping its sensor inputs directly, it could be from a spoken natural language instruction that needs to be translated to navigation commands, or it could be from a validation response in natural language for a validation question that needs to be translated to navigation commands. In a case where input data includes a natural language instruction or natural language validation response, one language instruction or validation response could correspond to several navigation steps. To this end, a single neural RL architecture, typically followed for semantic audio-goal navigation tasks, might be insufficient in effective navigation because different second level controllers 122 are trained using diverse publicly available datasets that may not include all modalities and it may be desired that each of the second level controllers 122 caters to specific modalities. Moreover, different second level controllers 122 offer diverse levels of semantic information for the navigation task such that a number of steps robot agent can take using the different input data could be different. For example, using natural language instructions may allow the robot 100 to take multiple steps, while offer only single steps when using an audio or video goal-based navigation.

Such semantic levels of different modalities bring in several challenges such as, if there is a budget on a number of queries the robot 100 can ask the oracle, what is a good criterion for the robot 100 to decide when to invoke the natural language query modality or the natural language question modality, what would be a good way to synchronize between the modalities so that they offer a cooperative policy to guide the robot to improve its navigation when the inputs (language, validation and sensors) are at different semantic levels, and how to update the memory or beliefs of the robot 100 at run time in a partially-observable setting. Distinct modalities may lead to different navigation paths with varied length of trajectories (e.g., audio-visual navigation might be one-step navigation, while the natural language instructions and validation response may lead the robot 100 to make multi-steps with one query/question/validation). For example, a hierarchical RL setup or framework may be used to address the issue of different modalities. To this end, the present disclosure discloses the multimodal hierarchical RL neural network 118 for BI-AVLEN consisting of the first level controller 120 having the high-level policy $\pi_s$ that takes the inputs from the robot's perception modules, a current belief state and a history of prior actions, and select from the three second level controllers 122, i.e., an audio-visual goal based policy $\pi_g$, a natural language question generation based policy $\pi_{ques}$, and a natural language instructions based query policy $\pi_l$.

An object of the present disclosure is to address the above-mentioned problems. In this regard, the hierarchical multimodal RL neural network 118 is implemented by the first level controller 120 to guide the robot 100 for performing the navigation task.

At 402, the first level controller 120 selects one of the second level controllers 122 to perform a first interaction relating to the navigation task, based at least on a state of the hierarchical multimodal RL neural network 118. The state of the hierarchical multimodal RL neural network 118 may include all of the information necessary to predict the effects of an interaction on the completion of the navigation task. The state may also determine if it is a goal state, i.e., destination state. To this end, the state may indicate an effect of a previous interaction on the robot 100 and a comparison between an action performed based on the previous interaction and the goal state. In certain cases, the first level controller 120 may select one of the second level controllers 122 based on input data. In an example, the input data may include sensor based observation data obtained from an environment, such as the environment 222. In another example, the input data may include a natural language instruction or a natural language validation from an oracle in the environment. In yet another example, the input data may include any combination of visual sensor data, audio sensor data and natural language instruction.

In an example, the different second level controllers 122 may relate to different modalities. Subsequently, the different second level controllers 122 may utilize different equations or parameters for effectuating an interaction of the robot 100 with the environment 222 and/or an entity, such as the oracle. Moreover, the different second level controllers 122 may utilize different parameters to determine a state of the hierarchical multimodal RL neural network 118 or a change of state of the hierarchical multimodal RL neural network 118.

At 404, the selected second level controller from the second level controllers 122 is configured to determine a control command based on performing the first interaction. The selected second level controller may utilize its corresponding policy to determine the control command. For example, the control command may be provided to the motor 114 or actuators of the parts of the robot 100.

In an example, when the selected second level controller is the first sub level controller 122a relating to the first modality, the first sub level controller 122a may determine the control command based at least on a first set of state variables associated with the state of the hierarchical multimodal RL neural network 118 and input data. For example, the first sub level controller 122a may query the oracle using a first predefined question from a set of predefined question, wherein the predefined questions may be asked to seek partial navigation instructions for completing the navigation task. Further, when the selected second level controller is the second sub level controller 122b relating to the second modality, the second sub level controller 122b may generate a validation question based on the states and the sensor data to seek a validation response from the oracle. The second sub level controller 122b may determine the control command based at least on a second set of state variables associated with the state of the hierarchical multimodal RL neural network 118 and input data. Subsequently, the input data includes the validation response that may confirm if a belief of the second sub level controller 122b is correct or not. To this end, the first set of state variables may be different than the second set of state variables.

Further, when the selected second level controller is the third sub level controller 122c relating to the third modality, the third sub level controller 122c may determine the control command based at least on a third set of state variables associated with the state of the hierarchical multimodal RL neural network 118 and input data. The input data may include at least one of: sensor-based audio information, or sensor-based video information.

In certain cases, one or more second level controllers 122 may be selected to process and interpret different types or modalities of input data, such as audio or video sensor measurements, natural language instructions, or validation response.

At 406, the robot 100 is controlled based on the control command determined by the selected second level controller. Based on a set of control instructions in the control command, the robot 100 or parts of the robot 100 may move. For example, by completing the first interaction, the robot 100 may move from a first pose to a second pose, wherein the first pose and the second pose are different from each other and may be apart from each other. Accordingly, the robot 100 may move from a start state to another state towards the goal state of the robot 100. By continuing such completion of interactions, the robot 100 may reach the goal state of the navigation task after the completion of a last interaction.

Figure 5:
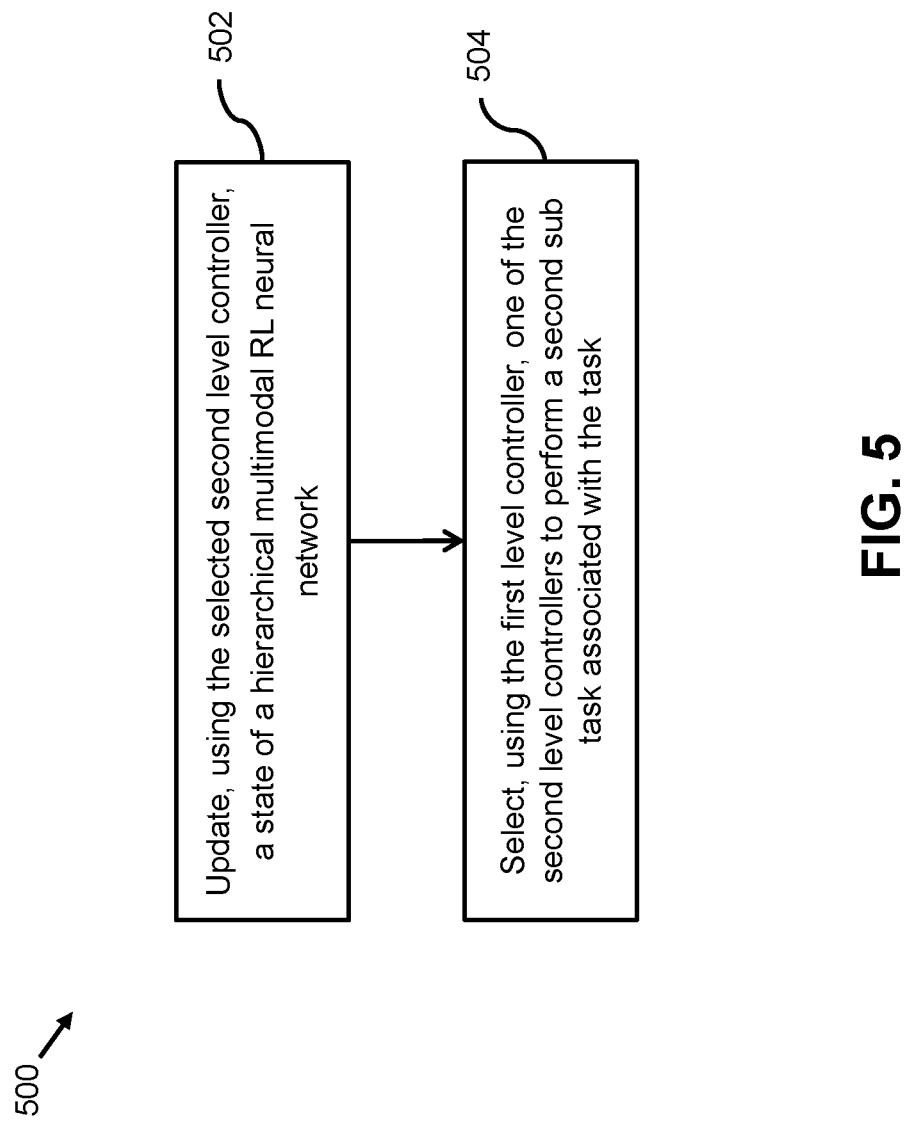
FIG. 5 illustrates an example method for updating the hierarchical multimodal RL neural network, according to some embodiments of the present disclosure.

Referring to FIG. 5, there is shown an example method 500 for updating the hierarchical multimodal RL neural network 118, in accordance with an embodiment.

At 502, the selected second level controller updates the state of the hierarchical multimodal RL neural network 118 based on performing the first interaction. For example, the state of the hierarchical multimodal RL neural network 118 may be updated by the selected second level controller that performs the first interaction based on the performing of the first interaction. Once the first interaction is completed or performed, the selected second level controller that performs the first interaction may update a set of state variable associated with the state of the hierarchical multimodal RL neural network 118. In an example, the first sub level controller 122a may update a first set of state variables based on the execution of the first interaction. Alternatively, the second sub level controller 122b or the third sub level controller 122c may update a second set of state variables or a third set of state variables, respectively, based on the execution of the first interaction.

In accordance with an embodiment, the selected second level controller may determine a current belief state associated with the hierarchical multimodal RL neural network 118. Further, the selected second level controller may modify the belief state of the hierarchical multimodal RL neural network 118 based on the updated state of the hierarchical multimodal RL neural network 118, the performing of the first interaction, and execution of a part of the navigation task based on the first interaction. In particular, the belief state includes beliefs of the robot 100 about its current state. The belief state may indicate a distribution for different variables, such as location, estimated distance from the goal state, estimated direction of the goal state, and so forth, corresponding to the current state of the hierarchical multimodal RL neural network 118 and/or a current state of the robot 100 with respect to the sounding object 224 or goal. In an example, the belief may be stored in the memory 124 associated with the robot 100 or associated with the hierarchical multimodal RL neural network 118 as a neural embedding.

In an example, the first level controller 120 invokes or selects one of the second level controllers 122 for navigation, wherein the selected second level controller relates to a single step policy, i.e., audio or video based modality. In this regard, the selected second level controller may be the third sub level controller 122c having the third modality relating to audio-visual based modality. In such a case, the selected second level controller, or the third sub level controller 122c, updates the belief state in the memory 124 for every step, i.e., after performing every step based on an interaction with the environment 222.

In another example, the first level controller 120 invokes or selects one of the second level controllers 122 for navigation, wherein the selected second level controller relates to a multi-step policy, i.e., natural language based modality. In this regard, the selected second level controller may be the first sub level controller 122a having the first modality relating to natural language query modality or the second sub level controller 122b having the second modality relating to natural language question modality. In such a case, the selected second level controller, i.e., the first sub level controller 122a or the second sub level controller 122b, generates a new belief state based on the execution of the control command associated with the first interaction. The new belief state relates to the environment where the robot 100 is navigating to perform the search operation. For example, the first sub level controller 122a or the second sub level controller 122b uses the existing memory and received language instruction or natural language validation response to produce the new belief of the environment 222. To this end, the natural language modality is assumed to be semantically superior modality as compared to the audio or video based modality. The new belief state may then be used to replace the current belief state or belief history. In this regard, the first sub level controller 122a or the second sub level controller 122b may clear any previous belief state and replace it with the new belief state.

At 504, the first level controller 120 selects one of the second level controllers 122 to perform a second interaction relating to the task, based at least on the input data, previous state of the hierarchical multimodal RL neural network 118 and the updated state of the hierarchical multimodal RL neural network 118. The second interaction is performed after the first interaction for completing the main task, such as navigating to the semantic sounding object 224. In this regard, the first level controller 120 may obtain new input data from the environment 222. For example, the new input data may indicate change in surroundings of the robot 100 due to the navigation of the robot 100 based on control commands generated based on the first interaction. Subsequently, the first level controller 120 may assess the update in the state of the hierarchical multimodal RL neural network 118 based on the new input data, previous state of the hierarchical multimodal RL neural network 118 and the updated state of the hierarchical multimodal RL neural network 118. For example, the first level controller 120 may check whether the state of the hierarchical multimodal RL neural network 118 indicates that the robot 100 is closer to a goal state or farther from the goal state. Accordingly, the first level controller 120 may identify a modality for the second interaction to be performed in order to navigate the robot 100 towards the goal state.

In an example, the first level controller 120 may check whether the state of the hierarchical multimodal RL neural network 118 is closer or farther from the goal state based on, for example, the new input data. For example, the new input data may indicate an intensity of audio sound emitted by the semantic sounding object 224 in the environment 222 received at the updated pose of the robot 100. In this manner, the first level controller 120 may determine if the robot 100 has moved closer to the goal state or farther from the goal state.

Based on the updated state of the hierarchical multimodal RL neural network 118 and the new input data, the first level controller 120 may select one of the second level controllers 122 to perform the second interaction. In an example, when the first level controller 120 determines that the updated state of the hierarchical multimodal RL neural network 118 indicates that the robot 100 is moving farther from the goal state or the robot 100 is no longer certain about navigation towards the goal state, the first level controller 120 may select the first sub level controller 122a relating to the natural language instructions based modality to query the oracle in the environment directly for navigation of the robot 100 in an effective manner.

Alternatively, when the first level controller 120 determines that the updated state of the hierarchical multimodal RL neural network 118 indicates that the robot 100 is moving closer to the goal state, the first level controller 120 may select the second sub level controller 122b relating to natural language validation question based modality or the third sub level controller 122c relating to the audio or video based modality. In particular, when the first level controller 120 determines that the belief state and the new input data corresponding to the updated state of the hierarchical multimodal RL neural network 118 or the robot 100 indicates that a path towards the goal location or goal state for the navigation task is clear or easily definable, then the first level controller 120 may select the third sub level controller 122c relating to the audio or video based modality for performing the second interaction based on the new input data relating to the environment and the updated state of the hierarchical multimodal RL neural network 118. However, when the first level controller 120 determines that the belief state and the new input data corresponding to the updated state of the hierarchical multimodal RL neural network 118 indicates that a path towards the goal location or the goal state for the navigation task is not certain or may have different possible paths and the robot 100 is confused between two or more possible paths for completing the navigation task, then the first level controller 120 may select the second sub level controller 122b relating to the natural language validation question based modality for performing the second interaction based on the new input data relating to the environment 222 and the updated state of the hierarchical multimodal RL neural network 118 and a new validation response.

Figure 6A:
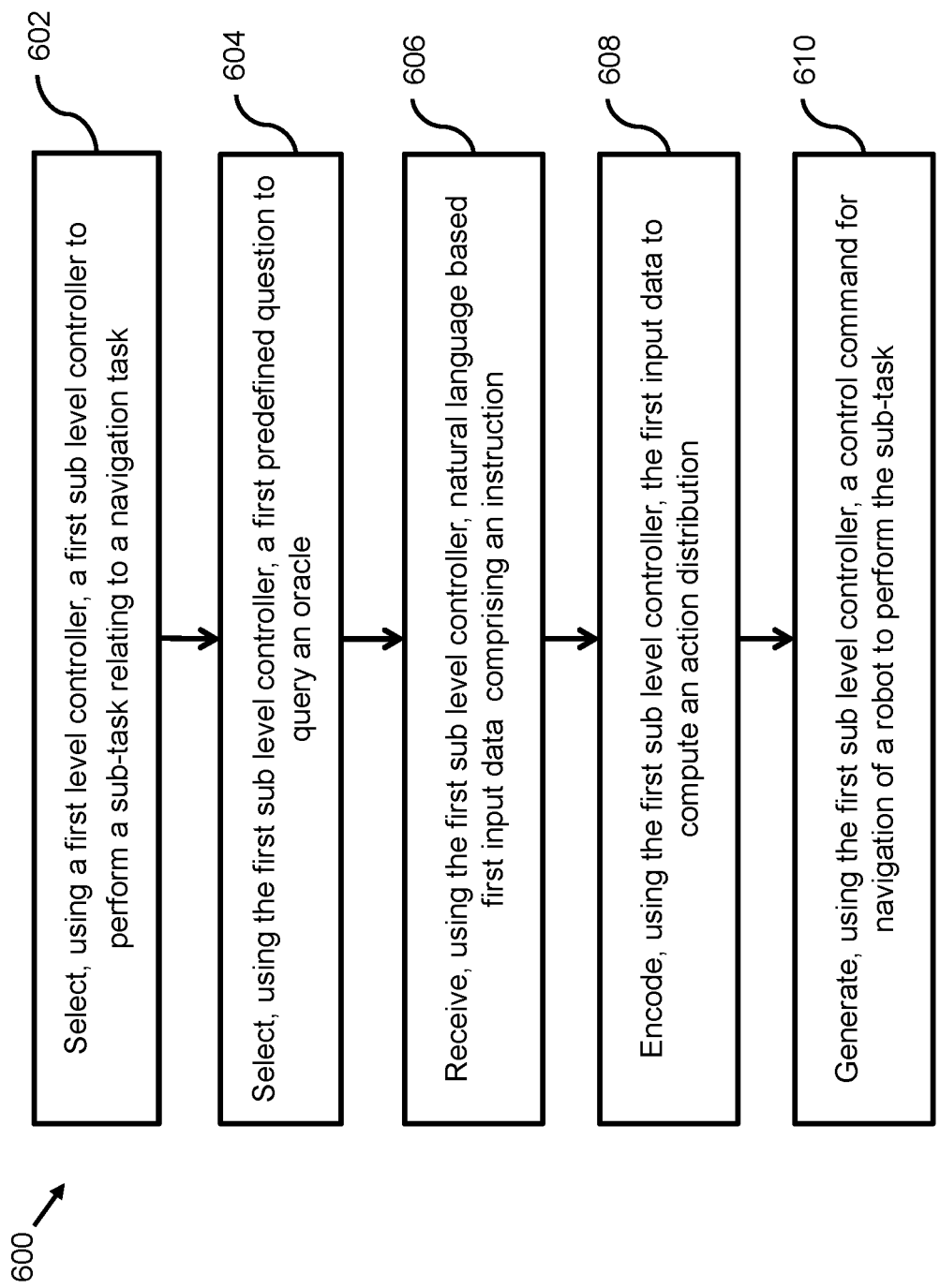
FIG. 6A illustrates an example method for performing a sub-task using a first sub level controller, according to some embodiments of the present disclosure.
Figure 6B:
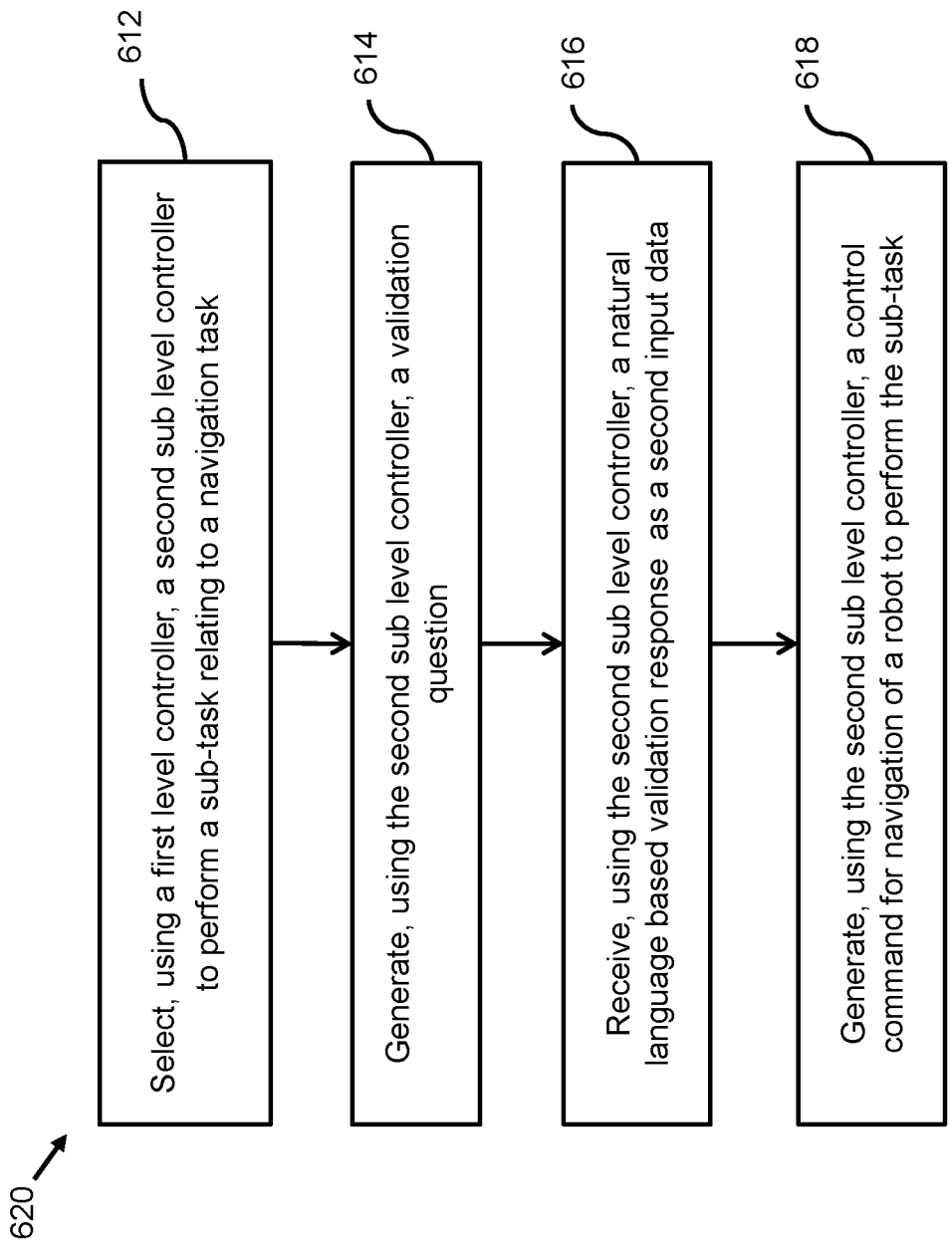
FIG. 6B illustrates an example method for performing a sub-task using a second sub-level controller, according to some embodiments of the present disclosure.
Figure 6C:
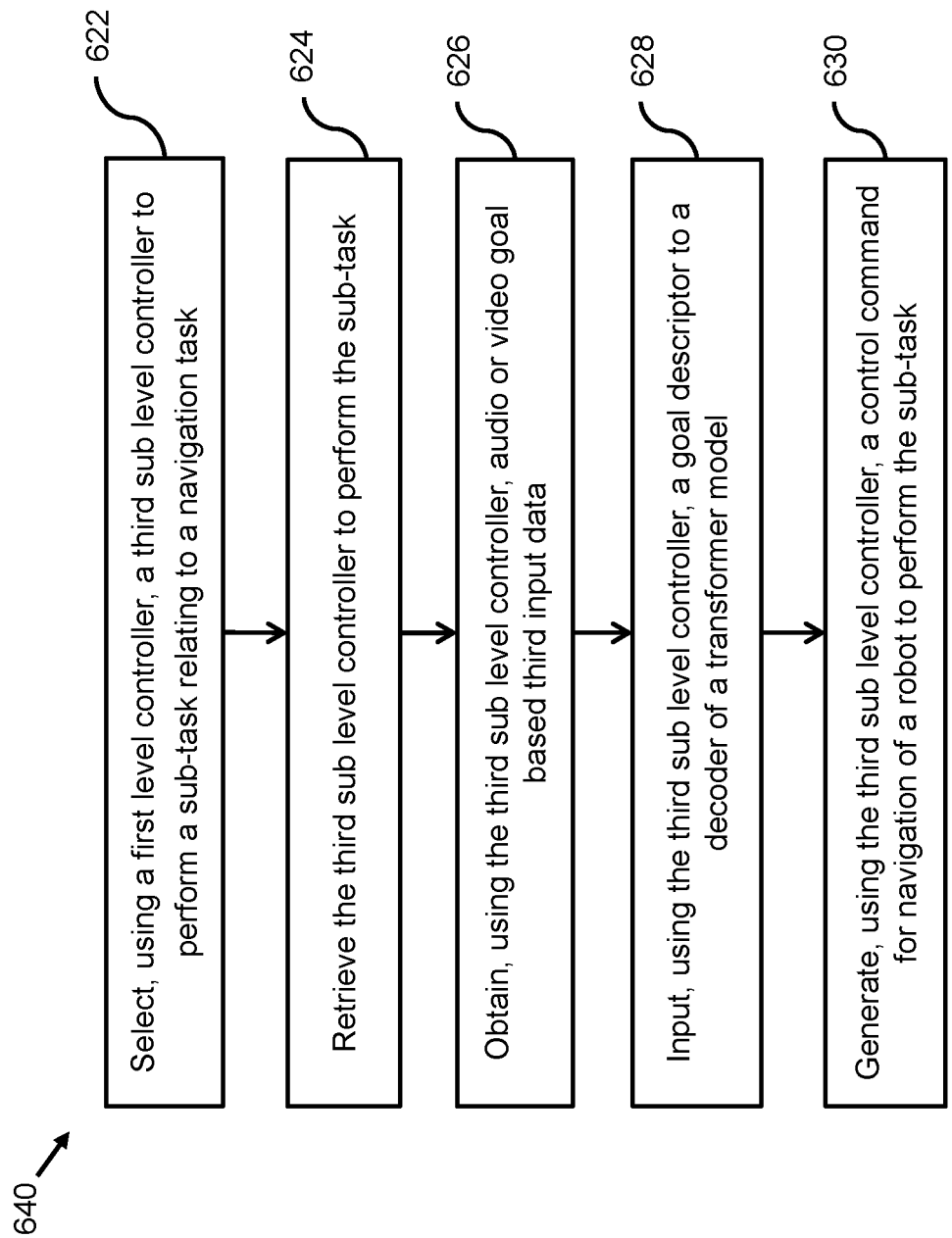
FIG. 6C illustrates an example method for performing a sub-task using a third sub-level controller, according to some embodiments of the present disclosure.

The operation of the three second level controllers 122 are further described in conjunction with FIGS. 6A, 6B and 6C.

FIG. 6A shows an example method 600 for performing an interaction using the first sub level controller 122a having the first policy $\pi_l$, in accordance with an embodiment. As described above, the robot 100 may use the first level controller 120 and the high-level policy, $\pi_s$, to select the first sub level controller 122a to perform the interaction.

At 602, the first level controller 120 selects the first sub level controller 122a to perform the interaction using the first modality. For example, the first sub level controller 122a may be configured with the first policy $\pi_l$ relating to natural language instructions query based modality.

Once selected, the first sub level controller 122a is triggered. Subsequently, the first policy $\pi_l$ is triggered to perform the interaction. In an example, the first policy $\pi_l$ has transformer based framework. As may be understood, self-attention may be implemented by transformer model for neural machine translation. To this end, self-attention by the transformer model follows an encoder-decoder structure without relying on the use of recurrence and convolutions. As may be noted, the encoder of the transformer model is to map an input sequence to a sequence of continuous representations, which is then fed into a decoder. Further, the decoder of the transformer model receives output of the encoder together with decoder output at the previous time step to generate an output sequence.

At 604, the first sub level controller 122a is retrieved to perform the interaction. In this regard, the first sub level controller 122a may select a first predefined question from a set of predefined questions to query an oracle based on the state of the hierarchical miultimodal RL neural network 118. The first sub level controller 122a may be based on natural language instructions query based modality. For example, the language-based navigation query policy, i.e., the first policy $\pi_l$ follows a two stage training. In an example, the first stage consists of an off-policy training. In this regard, fine-grained instructions to learn the first policy $\pi_l$ may be repurposed. Further, the second stage consists of on-policy training. During rollouts in the hierarchical framework of the first level controller 120 having the high-level policy $\pi_s$, the robot 100 interacts with the oracle and receives language instructions. The instructions may be used to determine a shortest path trajectory towards the goal to fine-tune the first policy $\pi_l$. In both the stages, the first policy $\pi_l$ is trained with an Imitation Learning objective.

In an example, during the training of the first policy of the first sub level controller 122a, a reward for selecting and operation of the first sub level controller 122a may be defined by a negative reward $\zeta_q$ to penalize a number of times the robot 100 may query the oracle for language instructions directly. Further, a penalty $\zeta_{f}$ is used when consecutive queries to the oracle using the first policy are made within τ steps. Given that the hierarchical multimodal RL neural network 118 is encouraged to query the oracle less than K times for direct instructions, a total penalty incurred by the first level controller 120 of the high-level policy $\pi_s$ by selecting the first sub level controller 122a may be $\partial_q + \zeta_f$.

In addition, during the training of the first policy, the robot 100 may navigate on the ground-truth trajectory by following teacher actions and calculate a cross-entropy loss for each decision in each step by $-\Sigma_t a_t^* \log(p_t^a)$ where $a^*$ is a ground truth action and $p_t^a$ is an action probability predicted by the first policy $\pi_l$. based on the reward and cross-entropy loss, the first policy may be trained to generate an action distribution.

During operation, the first sub level controller 122a may query the oracle using a predefined question. For example, the first sub level controller 122a may select the first predefined question, for example, "Help" or "Where do I go now?", from the set of predefined questions based on surroundings of the robot 100 and/or state of the hierarchical multimodal RL neural network 118. The first sub level controller 122a may query the oracle to receive input data in form of natural language instructions (referred to as first input data, hereinafter). In this manner, the first sub level controller 122a directly queries for navigation instructions from the oracle. This may increase a load on the oracle as the oracle may have to provide complete instructions for completion or partial completion of the navigation task. However, the first sub level controller 122a may ensure that the robot 100 navigates in effective and time-efficient manner in unseen environments with reduced number of incorrect movements.

At 606, the first sub level controller 122a receives natural language based first input data relating to the navigation environment. In an example, the natural language based first input data may include an instruction X. The first input data may also include an initial observation $O_0$. Given the instruction X and the initial observation $O_0$, the language based navigation framework, i.e., the first sub level controller 122a, performs a sequence of actions $\langle a_1, a_2, \ldots, a_T \rangle$, each $a_i \in A$. In this regard, first sub level controller 122a may use self-attention to capture information from the sequential inputs and encode the belief state. For example, the transformer based framework obtains current observation and memory information as first input data for the transformer based framework at any time step of the language based navigation.

At 608, the first sub level controller 122a uses a Contrastive Language-Image Pre-Training (CLIP) model to encode the first input data comprising speech and/or visual instruction X. The CLIP model comprises a neural network trained on different image and text pairs. The CLIP model includes two sub-models, called encoders, including a text encoder and an image encoder. The text encoder embeds text or text converted from speech instructions into a mathematical space while the image encoder embeds images or visual instructions into a mathematical space. For example, speech, textual and/or visual instruction X may be infused with a current belief state using a feed forward network. Then, the fused belief state and natural language instruction X are processed with another transformer based framework to obtain a final belief of the state, which is then used for computing an action distribution.

At 610, the first sub level controller 122a generates a control command for navigation of the robot 100 based on the instruction received by performing the interaction In this regard, the first sub level controller 122a uses the transformer based framework to execute instruction based navigation. The first sub level controller 122a employs an action sampler to sample a set of control actions from the action distribution and generate the control command. The first sub level controller 122a may also interact with the environment 222 and perceive new observations as it executes the control command. In this manner, the first sub level controller 122a is configured to determine the control command based on the natural language instruction X.

Referring to FIG. 6B, there is shown an example method 620 for performing an interaction using the second sub level controller 122b having the second policy $\pi_{ques}$, in accordance with an embodiment. As described above, the robot 100 may use the first level controller 120 and the high-level policy, $\pi_s$, to select the second sub level controller 122b to perform the interaction.

At 612, the first level controller 120 selects the second sub level controller 122b to perform the interaction using the second modality. For example, the second sub level controller 122b may be configured with the second policy $\pi_{ques}$ relating to the second modality. In an example, the second modality may correspond to natural language question based modality.

Once selected, the second sub level controller 122b is triggered. Subsequently, the second policy $\pi_{ques}$ is triggered to perform the interaction. In an example, the second policy $\pi_{ques}$ also has transformer based framework. As described above, the transformer based framework may implement self-attention and follows an encoder-decoder structure without relying on the use of recurrence and convolutions.

At 614, the second sub level controller 122b is triggered to generate a validation question to perform the interaction. The second policy $\pi_{ques}$ may be based on natural language question based modality. For example, the natural language question based policy, i.e., the second policy $\pi_{ques}$ comprises three networks to enable bi-directional interaction abilities between the robot 100 and the oracle. In an example, the second policy $\pi_{ques}$ comprises as a trajectory determination network (referred to as TrajectoryNet, hereinafter) that forecasts one or more plausible navigation trajectories or path that the robot 100 may potentially take to reach the audio goal or the sounding object 224 or to partially complete the navigation task. Further, the second policy $\pi_{ques}$ comprises a question determination network (referred to as Question-Net, hereinafter) that allows the robot 100 to use the forecasted one or more trajectories to generate a natural language validation question. In this manner, based on the surroundings of the robot 100 and the state of the hierarchical multimodal RL neural network 118, the second policy $\pi_{ques}$ may generate the validation question to query the oracle. To this end, the validation question may be specific to the environment 222 in which the robot 100 is navigating or moving.

During operation, the second sub level controller 122b may query the oracle using the generated validation question. For example, the second sub level controller 122b may generate the validation question based on a current state and pose of the robot 100, current state of the hierarchical multimodal RL neural network 118, environment parameters, current belief state, initial state and pose, and goal state and pose. In an example, the second sub level controller 122b may look for landmarks in the environment 222 that the robot 100 is exploring. Further, the second sub level controller 122b may identify one or more possible paths for completing or partially completing the navigation task, such that the robot 100 may move towards or closer to the goal state, i.e., towards the sounding object 224. In particular, a number of possible paths may be limited, for example, less than three, less than five.

To this end, based on the landmarks in the environment 222 and the one or more possible paths for completing or partially completing the navigation task, the second sub level controller 122b may generate the validation question. In certain cases, the second sub level controller 122b may generate the validation question to interact with an entity to clarify a doubt, for example, whether to take a first path or a second path, to take a left or right, to take a first right or a second right to reach a landmark, and so on. Examples of the validation question may include, but are not limited to, "Should I go inside the house, or should I go around the house?", "Should I move towards the sofa?", "Should I take a left or a right?", and "Should I move towards the hallway?". In certain cases, the validation question may also include one or more predefined answers, such as "Yes or No", "Right or Left", and the like.

For example, if the number of possible paths is more than five or ten, then the second sub level controller 122b may relinquish control back to the first level controller 120, and the first level controller 120 may select the first sub level controller 122a to ask an open-ended question to the oracle.

In an example, during the training of the second policy of the second sub level controller 122b, a reward for selecting and operation of the second sub level controller 122b may be defined as a negative reward (ques to penalize a number of validation questions being asked to the oracle. The penalty (ques takes a form similar to the penalty $\zeta_q$ associated with the first policy, except for a multiplier factor $\delta$ ques $(k) \in$ [0,1]. Further, for defining the penalty for selecting the second sub level controller 122b, only wrong validation questions are limited to a count of K. For example, if for a validation question, the oracle provides an affirmative validation response, such as "yes", "go ahead", "right", and so forth, (i.e., a belief of the validation question is right) then those validation questions are not counted and a number of validation questions that the robot 100 can further ask remains unchanged. Further, when a validation question $(q_k)$ is correct, a reward of $\delta$ ques $(k)<1$ is assigned to the high-level policy, indicating that asking a correct validation question yields a reduced negative reward. Alternatively, when the validation question is wrong, i.e., the oracle's validation response towards the validation question is negative or a selection between one or more possible trajectories, such as "no, take a right instead", "no, go towards the hallway", "go towards the sofa and not towards the room", etc., a penalty of $\delta$ ques $(k)=1$ may be assigned to the high-level policy. In addition, asking consecutive validation questions attracts a penalty of $\zeta$ $f_g$ that takes a same form as the penalty $\zeta_f$ for consecutive queries using the first policy. Thus, a total penalty and/or reward incurred by the first level controller 120 of the high-level policy $\pi_s$ by selecting the second sub level controller 122b having the second policy $\pi_{ques}$ may be $\zeta_{ques} + \zeta$ $f_q$. The exact forms of these penalties may be denoted as:

$$\zeta q(k) = \begin{cases} \dfrac{k \times (r_{neg} + \exp(-v))}{v} & k < K \\ r_{neg} + \exp(-k) & k \geq K, \end{cases}$$

$$\zeta_f(j), \zeta f_q(j) = \begin{cases} \dfrac{r_f}{j} & 0 < j < \tau \\ 0 & \text{otherwise}, \end{cases}$$

$$\zeta_{ques}(k) = \begin{cases} \dfrac{k \times (r_{neg} + \exp(-v))}{v} \delta_{ques}(k) & k < K \\ r_{neg} + \exp(-k) \delta_{ques}(k) & k \geq K, \end{cases}$$

where $r_{neg}$ is set to −0.6, and $r_f$ is set to −0.5, $\delta_{ques}(k)$ is set to 0.0 when the validation question being asked matches or is right. Using this reward setup, the second policy may also be trained using decentralized distributed proximal policy optimization (DD-PPO) algorithm.

At 616, the second sub level controller 122b receives natural language validation response based second input data relating to the navigation environment 222. In an example, the natural language validation response based second input data may include a validation response Y. The second input data may also include an initial observation $O_0$. Given the validation response Y and the initial observation $O_0$, the second sub level controller 122b performs a sequence of actions. The second policy $\pi_{ques}$ may use self-attention to capture information from the second input data and encode the belief state.

In an example, the second policy $\pi_{ques}$ comprises as an interpretation network (referred to as, FollowerNet, hereinafter) that interprets the validation question. In an example, if the oracle is a computing system, such as a smart traffic system, a smart navigation and/or routing system, a robot training system, and the like, then the FollowerNet may be implemented on the oracle to interpret or decode the validation question and answer the validation question. In this manner, the second sub level controller 122b may work in coherence with the oracle, for example, when the oracle is not a human, to effectively complete the navigation task without incurring high costs (that may be incurred by asking for navigation instructions directly, such as by using the first sub level controller 122a), and without performing large number of incorrect steps or wandering endlessly that may make affect effectiveness of the operation.

The second sub level controller 122b may query the oracle to receive the second input data in form of natural language validation response. In this manner, the second sub level controller 122b queries for a validation response from the oracle. This may reduce a load on the oracle as the oracle may not have to provide entire navigation instructions, rather only check if a path determined by the robot 100 is correct or not. Moreover, by querying the oracle using the validation question to receive the second input data as the validation response, an accurate communication may be performed between the oracle and the robot 100. In particular, the validation response that may be a selection of a predefined answer from the one or more predefined answer, may remove any ambiguity that may arise due to semantic translation of natural language. In this way, the second sub level controller 122b may ensure that the robot 100 navigates effectively in unseen environments while also ensuring that reduced number of incorrect steps are performed by seeking validation from the oracle in cases of confusion or ambiguity.

At 618, the second sub level controller 122b generates a control command for navigation of the robot 100. In this regard, the second policy uses the transformer based framework to execute the validation response based navigation. The second sub level controller 122b may employ an action sampler to sample the control command from an action distribution and generate the control command for the robot 100. The second sub level controller 122b may also interact with the environment 222 and perceive new observations as it executes the control command. The robot 100 may navigate on the ground-truth trajectory by following teacher actions and calculate a cross-entropy loss for each decision in each step. In this manner, the second sub level controller 122b is configured to determine the control command based on the second input data or the natural language validation response Y and the natural language validation question.

It may be noted that there may be circumstances when the robot 100 or the hierarchical multimodal RL neural network 118 may be unable to create a validation question to ask the oracle, for example, when there are no useful landmarks to use for the validation question, or the robot is unsure of its current state or pose and/or goal state or pose, or when it is confused between several (for example, more than a predefined limit of two potential paths, three potential paths, five potential paths, and so forth) paths to select from. To avoid large number of trials and errors due to ambiguous circumstances, the robot 100 may directly query the oracle via selecting the first sub level controller 122a having the natural language instruction query policy Tre. When the first sub level controller 122a is invoked for querying the oracle, the robot 100 may receive the natural language instruction X. In certain cases, the robot 100 may also receive such natural language instruction X when an answer to the validation question generated by the second sub level controller 122b is "No" or "wrong", and the oracle may be required to re-configure a belief state of the hierarchical multimodal RL neural network 118 or provide additional natural language instruction to the robot 100 to ensure smooth operation of the robot 100. To this end, a belief state based on the natural language instructions X may take priority over a current belief of the hierarchical multimodal RL neural network 118, i.e., a belief state based on which the validation question was generated and/or a belief state established based on audio-video goal-based inputs from the environment.

Continuing further, FIG. 6C shows an example method 640 for performing an interaction using the third sub level controller 122c having a third policy, in accordance with an embodiment. As described above, the robot 100 may use the first level controller 120 and the high-level policy, $\pi_s$, to select one of the low level policies to perform the interaction. Pursuant to present example, the first level controller 120 may select the third sub level controller 122c having the third policy $\pi_g$.

The first level controller 120 selects the third sub level controller 122c to perform the interaction using third policy relating to the third modality. In an example, the third modality may relate to audio and/or video based modality. In another example, the third modality may relate to text based modality. To this end, pursuant to examples of the present disclosure, it is assumed that the third modality may relate to modalities that are free of natural language input. For example, input data associated with the third modality may not include natural language information, such as natural-language speech, or video information.

At 622, the third sub level controller 122c is triggered. Subsequently, the third policy is triggered to perform the interaction. In an example, the third policy $\pi_g$ is a transformer model. As may be understood, self-attention may be implemented by transformer model for neural machine translation. To this end, self-attention by the transformer model follows an encoder-decoder structure without relying on the use of recurrence and convolutions. As may be noted, the encoder of the transformer model is to map an input sequence to a sequence of continuous representations, which is then fed into a decoder. Further, the decoder of the transformer model receives output of the encoder together with decoder output at the previous time step to generate an output sequence.

At 624, the third sub level controller 122c is retrieved to perform the interaction. The third sub level controller 122c may be based on audio or video modality.

For example, the third sub level controller 122c is trained using Semantic Audio Visual (SAVi) navigation technique. In an example, the third sub level controller 122c may have a two-stage training, where in a first stage the memory modules are not used. Further, in the second stage, observation encoders are frozen and the third sub level controller 122c is trained with both current observation and history information from the memory module M. The training loss consists of a value-function loss, policy network loss to estimate the actions correctly, and an entropy loss to encourage exploration.

In an example, during the training, a reward of '+1' is assigned to reduce a geometric or geodesic distance towards the goal, and a '+10' reward to complete an episode successfully, i.e., completing the navigation task and reaching the audio goal or the sounding object 224. Additionally, a penalty of '−0.01' is added per time step to encourage efficiency and facilitating the robot to learn to reach the goal pose in minimum number of steps. A goal descriptor network outputs object category level and relative location estimation. Following the SAVi-based training, off-policy category level predictions and on-policy location estimator may be applied for performing the search operation, such as to navigate in the environment 222.

In an example, the third sub level controller 122c may have a transformer based encoder-decoder structure. For example, the encoder takes as input the current and previous observations from the memory module M, and an output of the encoder is combined with a goal descriptor g and decoded by the decoder to produce a feature vector defining a belief state b of the robot 100. Herein, a goal descriptor g may be derived by a goal network, $f_g$. The goal network, $f_g$ may embed information regarding the audio-goal object or the sounding object 224 of the task as well as an estimate of a relative goal location. Further, a single-layer actor-critic neural network transforms the belief state b to predict a distribution on the navigation actions, $\pi_g(b)$, which the robot 100 samples to take a step in the environment 222.

At 626, the third sub level controller 122c obtains audio or video goal based input data (referred to as third input data, hereinafter) relating to the navigation environment. In this regard, the third sub level controller 122c may use self-attention to perform interaction with the environment and obtain information from current observation and history information. To this end, the third input data may include information relating to the current observation and the history information. The third input data is then encoded. In an example, the input data is encoded in encoded memory as: $M_e$=Encoder(M) by the encoder of the transformer model.

At 628, a goal descriptor is input to the decoder of the transformer model. The decoder attends to information from all encoded time steps and generates a current step representation $s_t$. The decoder then uses an actor-critic network to predict the action distribution and value of the current state. For example, the actor-critic network may be modeled using a single linear layer neural network.

In accordance with an example, the goal descriptor (also referred to as the goal estimate) may include a semantic neural embedding of an object class associated with the semantic sounding object 224. For example, the semantic neural embedding may include a neural feature vector from a classifier model that takes as input the sound emitted by the semantic sounding object 224, and produces a class label of an object, i.e., the semantic sounding object 224, producing the sound. For example, a neural network may be pre-trained in a supervised manner to generate the neural feature vector and the semantic neural embedding. In addition, the goal descriptor may also include an estimated heading vector. For example, the estimated heading vector estimates an approximate spatial direction from which the robot 100 is receiving or has received the sound or audio, i.e., an approximate direction of the semantic sounding object 224. In an example, an absolute radial direction associated with the received sound, and sine and cosine of a heading angle associated with the received sound may be used to estimate the heading vector.

At 630, the third sub level controller 122c generates a control command for navigation of the robot 100. In this regard, the third policy employs an action sampler to sample the action from the distribution and generate the control command. The control command may be generated based on the interaction with the environment, the third input data and the state of the hierarchical multimodal RL neural network 118. Based on the control command, the robot 100 takes a step in the environment, such as the environment 222, and receives a new observation. To this end, the third sub level controller 122c is configured to determine the control command based on at least one of: sensor-based audio information or sensor-based video information.

It may be noted that each of the first sub level controller 122a, the second sub level controller 12b, and the third sub level controller 122c has associated reward and/or penalty, and further each time step has associated penalty. During operation, the first level controller 120, $\pi_s$, may determine resource constraints associated with selection of each of the second level controllers 122. To this end, a budget may be assigned to the first level controller 120 for completing the navigation task. The first level controller 120 having RL neural network may work to maximize reward. Therefore, based on the total assigned budget and the resource constraint associated with each of the second level controllers 122, the first level controller 120 may select one of the three second level controllers 122 or one of the three lo-level policies for performing an interaction.

Figure 7A:
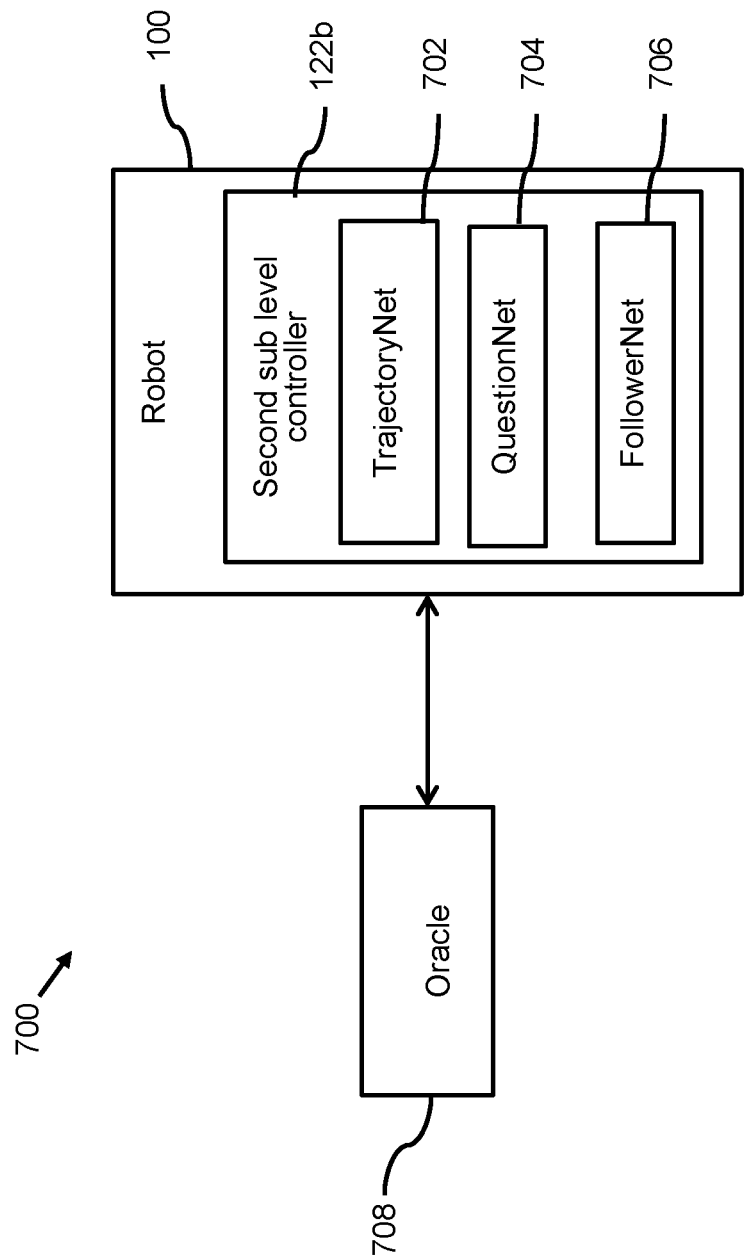
FIG. 7A illustrates a block diagram of the second sub level controller, according to some embodiments of the present disclosure.

FIG. 7A illustrates a block diagram 700 of the second sub level controller 122b, in accordance with an example, embodiment. It may be noted, the second sub level controller 122b relates to natural language validation question based modality. In particular, the second sub level controller 122b enables bi-directional interaction of the robot 100 with a human (or oracle). To this end, equipping the robot 100 with bi-directional interaction abilities leads to significant gains in performance of the robot 100, especially for localizing new sounds or in the presence of audible distractions.

As described above, the BI-AVLEN robot 100 is equipped with the hierarchical multi-modal RL neural network 118 having the first level controller 120 and the second level controllers 122. In particular, the first level controller 120 comprises a high-level policy to decide which second level controller to choose for performing an interaction. Moreover, each of the second level controllers 122 may have corresponding low-level navigation policies to perform the interaction to drive the robot 100 to its goal. In this regard, a manner in which the second sub level controller 122b performs an interaction to move the robot 100 is described in conjunction with the present FIG. 7A. The embodiments of the FIG. 7A are explained in conjunction with FIG. 7B, FIG. 7C and FIG. 7D.

The second sub level controller 122b having the second policy $\pi_{ques}$ may include a plurality of networks to carry out its operations. As shown, the second sub level controller 122b includes a TrajectoryNet 702, a QuestionNet 704, and a FollowerNet 706. During operation, the second sub level controller 122b may be configured to obtain a validation response from an oracle 708 in the environment 222. In certain cases, training of the second sub level controller 122b may also include training the oracle 708, specifically, when the oracle is a computing entity. In this manner, the oracle 708 may be configured to train robots, such as the robot 100, and/or assist in navigation task.

In order for the robot 100 to ask validation questions, the hierarchical multimodal RL neural network 118 may need to have clear observation of environment 222. In this regard, the second sub level controller 122*b* may be configured to receive a set of image frames associated with the environment. The set of image frames may indicate at least depth occupancy map, or panoramic view surrounding the robot 100. The set of images may provide a panoramic view to the robot 100 at its surroundings or around the current pose or location of the robot 100 in the environment 222. For example, an ego occupancy map may be calculated by transforming the set of images, such as depth images into point clouds and then projecting them onto a ground plane within a predefined distance, which is a sufficient viewing horizon for the robot 100.

Based on the full view of the surroundings of the robot 100 and a goal descriptor or a goal estimate corresponding to an audio goal, the second sub level controller 122*b* may forecast a sequence of one-step actions, denoted by $F_a$. In this regard, the TrajectoryNet 702 may be employed. A manner in which the TrajectoryNet operates is described in conjunction with FIG. 7B.

Figure 7B:
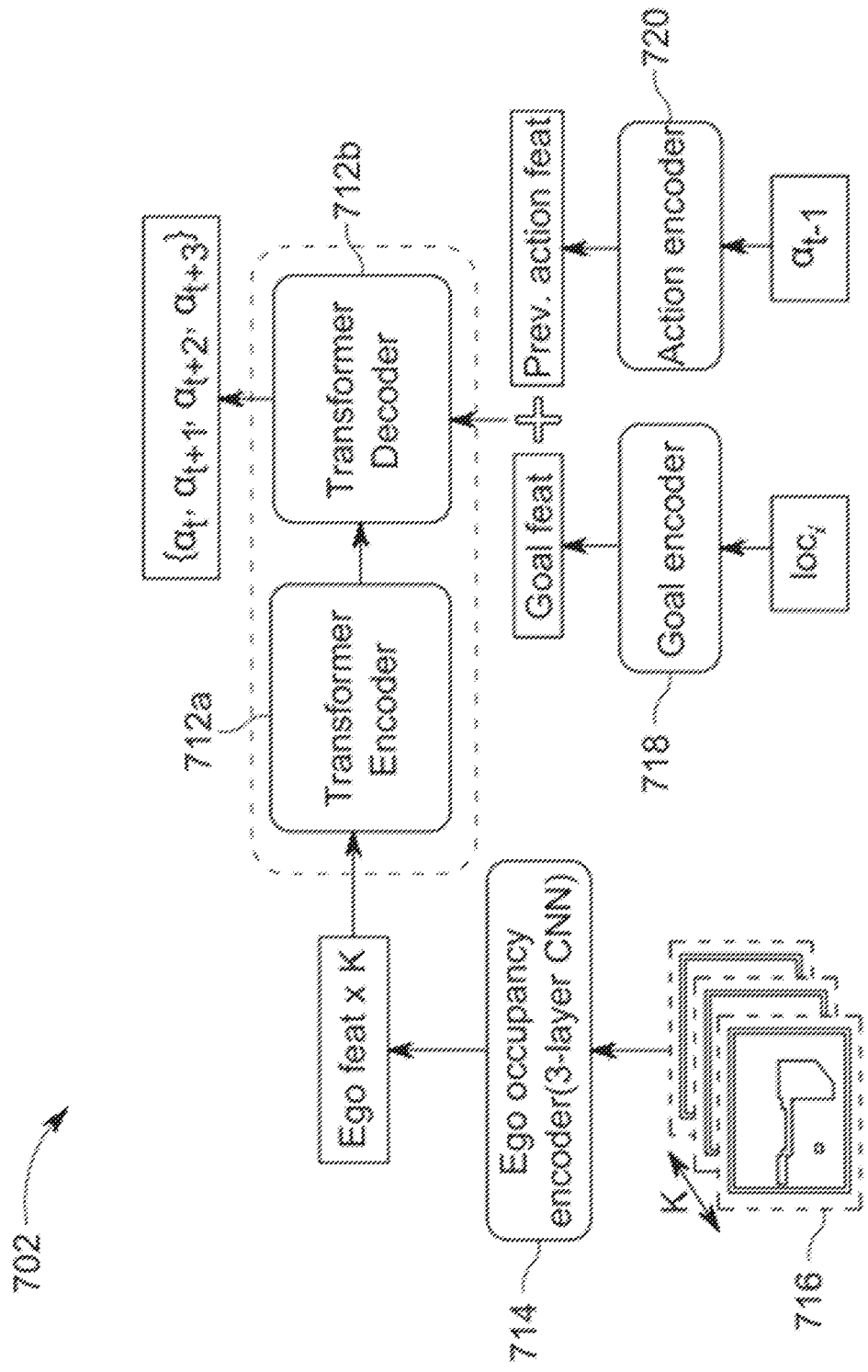
FIG. 7B illustrates a block diagram of a TrajectoryNet, according to some embodiments of the present disclosure.

Referring to FIG. 7B, a block diagram of the TrajectoryNet 702 is shown, in accordance with an example embodiment. The TrajectoryNet 702 comprises a transformer-based encoder 712*a* network and a transformer-based decoder 712*b* network that forecasts at least next four steps along a possible navigation trajectory that the robot 100 may take. In particular, a transformer inputs a sequence of ego occupancy maps Et of four views surrounding the robot 100 that may be generated based on the set of images. In other words, the inputs may include feature vectors corresponding to the four ego-centric occupancy map images, corresponding to the four views spanning the 360° surroundings of the BI-AVLEN robot 100. For example, each of the four views may cover an area of be 90-degrees of the robot 100, and the four views may be in separated directions and non-overlapping thereby covering a panoramic view of the robot 100. In an example, the feature vectors corresponding to the four ego-centric occupancy map images may be extracted using a 3-layer Convolutional Neural Network (CNN) 714 that takes as input a set of images 716 or egocentric occupancy maps of resolution, such as 31×31, while an output is a flattened 64-dimensional feature vector. In addition, the output of the CNN is then projected to 128-dimension, using a Multilayer Perceptron (MLP), before being added to a standard sinusoidal position encoding to be fed to the encoder 712*a*.

On the decoder 712*b* side, the decoder 712*b* is provided 64-dimensional vectors derived from a concatenation of a 32-dimensional encoding of an Audio-Goal vector and a 32-dimensional encoding of an action taken in a previous step. In this regard, the 32-D audio goal vector $g_t$ may be predicted by a goal estimation module or a goal encoder 718 ($f_g$), and the 32-D encoding of the action $a_{t-1}$ taken in the previous step may be generated by an action encoder 720. An output of the decoder 712*b* is a prediction of an action step denoted by: $F_a = \langle f_{a1}, f_{a2}, \ldots, f_{al} \rangle$. An action space of possible actions is four (viz., move forward: 0, turn_left: 1, turn_right: 2, stop: 3). The decoder 712*b* predicts a set of four successive steps $\{a_t, a_{t+1}, a_{t+2}, a_{t+3}\}$, auto-regressively, for one or more possible trajectories of the robot 100 during its operation.

For example, both the transformer encoder 712*a* and the transformer decoder 712*b* are 1-layer multi-head attention network with 4 heads with a hidden state size of 128 dimension. The TrajectoryNet 702 is trained via a cross-entropy loss with teacher forcing. During inference, greedy decoding (i.e., argmax over the predicted action probabilities) may be done to get the predicted actions for the next step or multiple possible next steps.

Once the TrajectoryNet 702 forecasts the actions for the next few steps or forecasts actions for one or more next possible navigation trajectories, the second sub level controller 122*b* may pose a question based on the forecast. The action sequences for the one or more possible next steps or trajectories may be fine-grained, e.g., move_forward may imply moving forward by 1 m. However, the natural language by itself is ambiguous and does not explicitly reflect the granularity of these fine-grained actions. In order to address this shortcoming, the second sub level controller 122*b* may further employ the QuestionNet 704 to generate the validation question. A manner in which the QuestionNet 704 operates is described in conjunction with FIG. 7C.

Figure 7C:
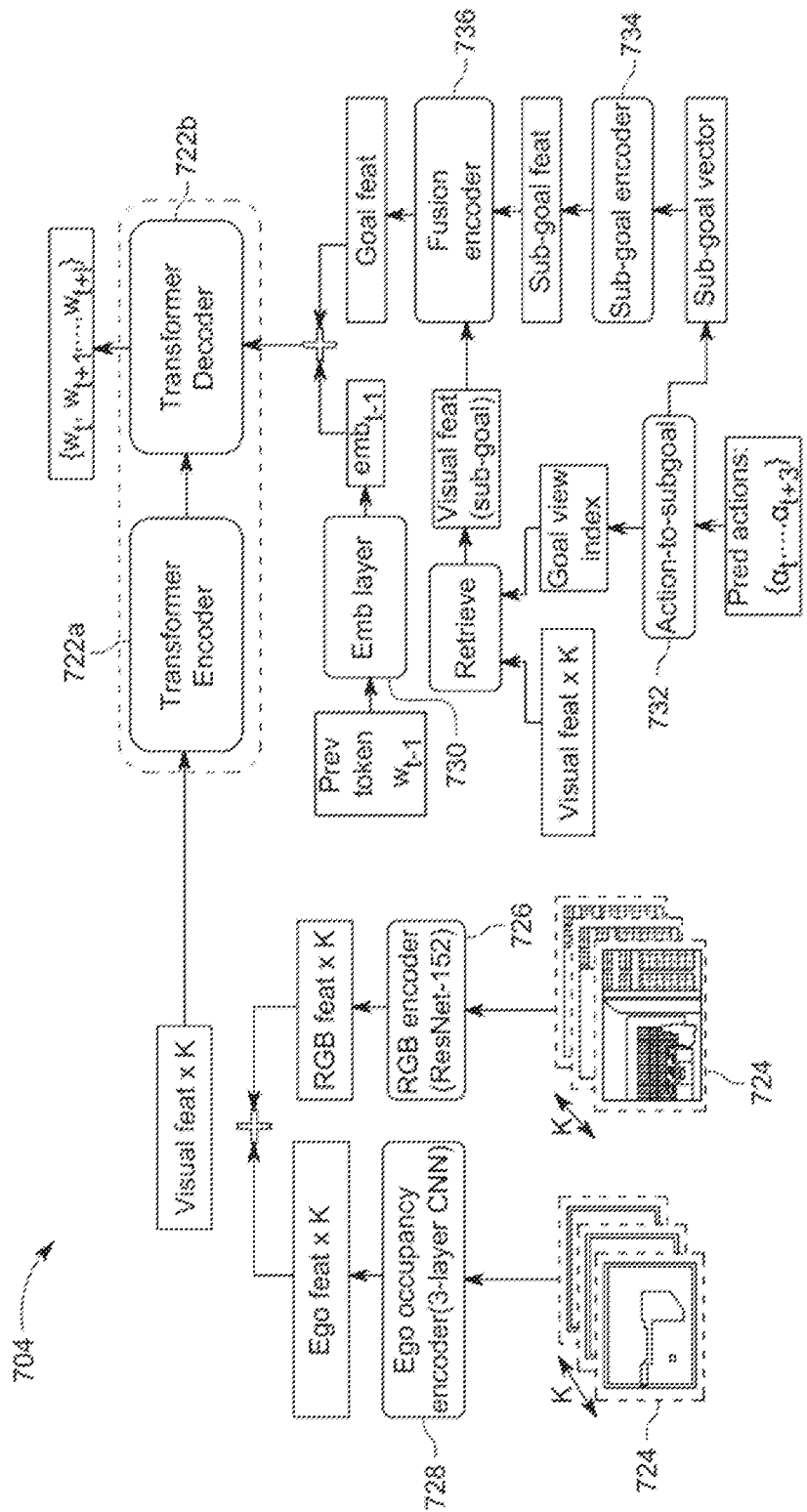
FIG. 7C illustrates an example block diagram of a QuestionNet, according to some embodiments of the present disclosure.

Referring to FIG. 7C, an example block diagram of the QuestionNet 704 is shown, in accordance with an example embodiment. It may be noted that the QuestionNet 704 also comprises a Transformer-based encoder 722*a* network and a transformer-based decoder 722*b* network. The transformer of the QuestionNet 704 may be tasked with synthesizing the validation question to be posed to the oracle (or human) to interact therewith. The encoder 722*a* takes as input a set of visual features or images 724 corresponding to 12 views of the entire surroundings of the robot 100. For example, each of the set of images 724 may be separate and may cover an area of 30 degrees around the robot 100, and together the set of images may represent a panorama view around the robot 100. The visual features corresponding to each of these views are 512-dimensional, obtained by projecting the concatenated 2048-dimensional RGB image features 726 from the set of images 724 encoded via a ResNet-152 network 728 pre-trained on the ImageNet dataset. Further, the ego occupancy maps of the surroundings of the robot 100 may be provided as inputs to the encoder 722*a*, and the encoder 722*a* selects a sub-goal view corresponding to one of the one or more possible trajectories. In an example, the 64-dimensional egocentric occupancy map features may be encoded through a pre-trained 3-layer CNN encoder 728.

The decoder 722*b* takes as input a set of features obtained by concatenating the output from the encoder 726 with the RGB features. Further, a 512-D goal embedding vector $emb_{t-1}$ generated by an embedding layer 730 and a 512-D pre-trained word embedding of sub-instructions for performing a possible trajectory for the completing or partially completing the navigation task are given as inputs to the decoder 722*b*. In particular, the sequence of actions $\{a_t, a_{t+1}, a_{t+2}, a_{t+3}\}$ forecasted by the TrajectoryNet 702 may be converted to a sub-goal view, gYvew, indicating a view in a heading direction of the robot 100 after considering as if taking the forecasted steps or navigation trajectory is travelled by the robot 100. In other words, for each of the one or more possible trajectories or next steps, an action-to-sub goal module 732 may determine the sub-goal view index, $g_{view}$, considering a pose and/or state that the robot 100 will reach after travelling on the one or more navigation trajectories. Further, the second sub level controller 122*b* may determine the sub-goal vector, $g_{sub}$, indicating a vector for each of the one or more navigation trajectories or each sequence of next action steps in moving from a current pose, location or state of the robot to a sub-goal location, pose or state, i.e., after travelling on the possible navigation trajectory. To this end, the sub-goal vector may be denoted as: $g_{sub} = [d_f, \cos(\theta_f - \theta_t), \sin(\theta_f - \theta_t)]$, where $d_f$ is a distance between the current location and final or sub-goal location after taking the sequence of action steps or one of the one or more possible navigation trajectories, $\theta_f$ indicates an angle of a displacement vector with the horizontal direction of motion, and $\theta_r$ indicates an angle of rotation swept by the motion of the robot 100.

It may be noted that the robot 100 does not actually move in any direction or on any possible navigation trajectory when forecasting the one or more possible navigation trajectories. Thus, the sub-goal view, $g_{view}$, is a final or sub-goal view from the current location and pose of the robot 100, if the robot 100 had taken the forecasted actions or navigation trajectories.

The goal embedding vector $G_{sub}$ may correspond to a projection, of the concatenation of the 512-D visual features of the heading view (i.e., facing the direction after taking the predicted actions) at the robot's original location and the 96-D encodings of the sub-goal features, $g_{sub}$, generated by a fusion encoder 736. The sub-goal vector, $g_{sub}$, may be a 3-D vector, which is encoded by tiling itself 24 times, using a sub-goal encoder 734. For example, for word embedding, a 300-D pre-trained Glove embedding may be used, such that the word embedding is then projected using a single layer MLP to 512-D or directly extract 512-D pre-trained CLIP embedding. The word embedding may be kept fixed throughout trainings.

In accordance with an embodiment, the encoder 722a and the decoder 722b are both multi-head attention networks with a 512-D hidden state and a number of heads set to 1. Number of layers in the encoder 722a and the decoder 722b may be, for example, 1 and 3, respectively. The decoder 722b decodes instruction tokens auto-regressively. The QuestionNet 704 model is trained with the cross entropy loss on word tokens using teacher forcing manner. During inference, greedy decoding (using argmax over the space of output tokens) is applied to generate the validation question comprising 1 number of word tokens $\{w_t, w_{t+1}, w_{t+2}, \ldots, w_{t+l}\}$.

In an example, an order of the image view sequence for a possible navigation trajectory which is fed as input to the encoder 722a, starts from a view in the current heading direction, and proceeds clockwise by 30 degrees. Moreover, a standard position encoding may be added to denote a count of the views. Based on the views of a possible navigation trajectory, one or more landmarks may be identified, for example, sofa, hallway, bed, and so forth. Further, based on the landmarks, the views or the set of images, and the language embedding, the QuestionNet 704 may generate the validation question. For example, the validation question may indicate a choice between the one or more possible navigation trajectories, wherein the one or more possible trajectories may be identified based on corresponding landmarks, location and/or directions. Once the second sub level controller 122b generates the validation question, the robot 100 may query the oracle 708 with the validation question.

Returning back to FIG. 7A, on receiving the validation question, the oracle 708 may be configured to provide a validation response. In an example, the oracle 708 may be a computing entity or a human. Pursuant to present examples, the oracle 708 may be a computing entity that may be deployed to assist the robot 100 and/or train the robot 100. In certain cases, the oracle 708 may be trained within the environment 222, such that the oracle knows about the environment 222. For example, if the robot 100 is deployed to navigate across a road network, then the oracle 708 may have information relating to traffic system and the road network. In another example, if the robot 100 is deployed to navigate in a building, such as a house, an office building, or a hospital, then the oracle 708 may have information relating to blueprint or construction information of the building, interior information of the building, and information relating to such as, people, equipment, objects within the building. Subsequently, the oracle 708 is capable of assisting the robot 100 in planning its routes, planning sub-goals, perform navigation tasks, and so forth. A manner in which the FollowerNet 706 is implemented is described in conjunction with FIG. 7D.

Figure 7D:
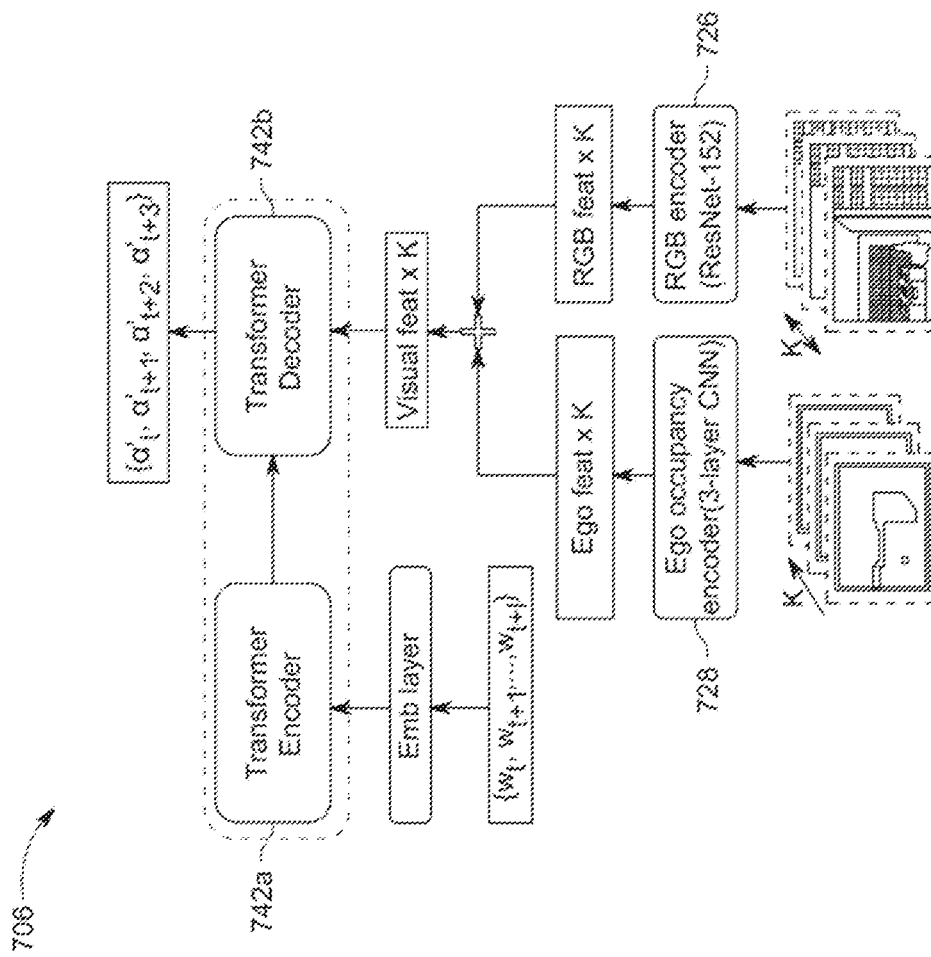
FIG. 7D illustrates an example block diagram of a FollowerNet, according to some embodiments of the present disclosure.

Referring to FIG. 7D, an example block diagram of the FollowerNet 706 is shown, in accordance with an example embodiment. This FollowerNet 706 also comprises a transformer-based encoder 742a and a transformer-based decoder 742b. The encoder 742a takes as inputs the embedding of the generated validation question/instruction comprising the word tokens. Further, the decoder 742b takes visual features corresponding to the four views, i.e., K=4, and an output of the encoder 742a as input. Each of the four views may be separate from each other by 90 degrees to give a panoramic view of the surrounding of the robot 100.

The FollowerNet 706 may also have access to the set of images captured by the robot 100 indicating the panoramic view of the location or surrounding of the robot 100. For example, the FollowerNet 706 may take the natural language validation questions or instructions as input and outputs a sequence of actions for the next few steps. In this manner, the FollowerNet 706 may perform a path matching between the shortest path between the current pose, (such as location and orientation) of the robot 100 and a goal pose of the navigation task, and the path or the sequence of actions outputted based on the decoded validation question.

In an example, visual feature encoders, such as an egocentric map encoder 726 implemented using the 3 layer CNN, and an RGB encoder 728 implemented using ResNet 152 of the FollowerNet 706 may be shared with the QuestionNet 704 module. Both the encoder 742a and the decoder 742b are 2-layer multi-head attention network with a number of heads being 4 and having a hidden-size of 512. The decoder 742b outputs a single token representing a combination of actions $\{a'_t, a'_{t+1}, \ldots, a'_{t+3}\}$ for the possible next steps by flattening a last layer of decoder 742b and passing it through a single layer MLP. For example, as a total number of valid combinations of a four-step action may be 30, the last layer may be designed to produce an action sequence of 4×30. Further, the last layer may be passed through the single layer MLP to produce a single action sequence with 4 steps.

The FollowerNet 706 is trained using a cross entropy loss on its output. During inference, the FollowerNet 706 outputs a token $\{a'_t, a'_{t+1}, \ldots, a'_{t+3}\}$ which is mapped back to the 4-step action sequence generated by the TrajectoryNet 702 and encoded in the validation question. For example, only the first 3 steps may be used as a final output due to the fact that the sub-goal vector $g_{sub}$ cannot unambiguously encode the heading view of the last action step in the validation question. To this end, based on the matching between the output token of a sequence of action for reaching the goal or the sub-goal, and action tokes of a sequence of actions encoded in the validation question, the FollowerNet 706 may determine a validation response, i.e., if the sequence of actions of the validation question is right or wrong.

In an example, the FollowerNet 706 may be configured to interpret a second input data received by the second sub level controller 122b from the oracle 708. For example, the second input data may include a validation response, such as "Yes", "No", "Right", "Wrong", "Right", "Left", "keep going", and so forth. In particular, the validation response may be a short answer or instruction that may confirm or disapprove a belief state of the robot 100, particular, a belief state of the second sub level controller 122b. In particular, the validation response may provide a certainty to a belief associated with the validation question and/or point to a right direction from one or more possible trajectories. In this manner, the validation response may enable the second sub level controller 122b to generate a control command for navigation of the robot 100.

Returning to FIG. 7A, if the validation response received by the second sub level controller 122b confirms a belief of the second sub level controller 122b or the hierarchical multimodal RL neural network 118 regarding a direction in which the robot 100 should move, then the second sub level controller 122b may generate the control command based on the current belief of the second sub level controller 122b. Moreover, if the validation response provides a selection of a correct trajectory from one or more possible trajectories in the validation question, then the second sub level controller 122b may generate the control command based on the received selection of the correct trajectory.

In an example, the second sub level controller 122b may receive the second input data comprising a negative validation response for the validation question. In such a case, the second sub level controller 122b may terminate generation of any control command. Instead, the second sub level controller 122b may update the belief state of the hierarchical multimodal RL neural network 118. In one example, the second sub level controller 122b may relinquish control to the first sub level controller 122a or the third sub level controller 122c for performing the interaction, or generate another validation question. For example, the second sub level controller 122b may incur a penalty and reframe or frame another validation question differently to query the oracle 708 differently. In this regard, a maximum number of validation questions that the robot 100 can ask the oracle 708, i.e., a budget associated with a number of times the oracle 708 can be queried using the second sub level controller 122b may be reduced by 1.

Further, in certain cases, the validation response may disapprove of a belief of the second sub level controller 122b regarding a direction in which the robot 100 should move, or disapprove of any of the one or more possible trajectories that the robot 100 should take. In one example, the second input data comprises the validation response and natural language data. In an example, the validation question may be "Should I go ahead towards the hallway?". Further, the second sub level controller 122b may receive the second input data as "No, go towards the kitchen". In this regard, the second input data may include the validation response "No" and natural language data, i.e., "go towards the kitchen". In this case, as the validation response disapproves of a current belief state of the robot 100 or the hierarchical multimodal RL neural network 118, the second sub level controller 122b may not perform any action relating to its belief state. To this end, no control command may be generated for moving the robot 100 based on the negative validation response. Instead, the second sub level controller 122b may terminate its operation and relinquish control to the first sub level controller 122a or the third sub level controller 122c for performing the interaction.

In addition, when the second sub level controller 122b fails to receive the second input data, i.e., the oracle 708 may not provide the second input data or provide a negative validation response, then the operation of the second sub level controller 122b may be terminated and, for example, the negative validation response may trigger the first sub level controller 122a or the third sub level controller 122c to perform the first interaction.

Alternatively, when the second sub level controller 122b fails to receive the second input data or provide a negative validation response, the second sub level controller 122b may try to explore the environment 222. In this regard, the second sub level controller 122b may generate a first control command based on the state of the hierarchical multimodal RL neural network 118. For example, the first control command may include a limited set of action steps, for example, three action steps, four action steps, and so forth. Further, the second sub level controller 122b may control the robot 100 based on the first control command. For example, based on the control command, the robot 100 may move across the set of action steps, for example, from a current state to a new state. Thereafter, the second sub level controller 122b may update the state of the hierarchical multimodal RL neural network 118 based on the execution of the first control command. The second sub level controller 122b may then generate a second validation question based on the updated state of the hierarchical multimodal RL neural network 118 and/or new state of the robot 100. For example, by querying the oracle 708 or interacting with the oracle 708 with the second validation question, the second sub level controller 122b may receive the second input data. Based on the received second input data, the second sub level controller 122b may determine the control command for further moving the robot 100 in the environment 222.

Pursuant to an example embodiment, the second input data received by the second sub level controller 122b comprises a validation response and natural language data. For example, if the validation response indicates a positive response or a selection of a correct trajectory from one or more possible trajectory, the second sub level controller 122b may generate the control command based on the validation response. Further, the second sub level controller 122b may update the state of the hierarchical multimodal RL neural network based on the natural language data and the execution of the control command. Alternatively, if the validation response indicates a negative response, the second sub level controller 122b will not generate any control command and updated the state of the hierarchical multimodal RL neural network based on the natural language data.

In one example, the oracle 708 may be configured to decode the validation question and provide the validation response based on a path matching. In particular, after the validation question is asked, the oracle 708, denoted as H, may verify if the validation question can be correctly translated back into a sequence of actions or a possible trajectory matching oracle actions for travelling between the current pose of the robot 100 to a sub-goal of the robot 100, along a shortest path. In this regard, the FollowerNet 706 may be implemented on the oracle 708 that may convert either a natural language validation question or an instruction to a low-level action space A.

The FollowerNet 706 may then generate the validation response based on the path matching. In particular, if the path matching is successful with respect to a first possible trajectory from the one or more possible trajectories, the validation response may include the landmarks, location or directions associated with the first trajectory, for example, "yes, take a right", "yes, go towards the sofa", and so forth. Based on the validation response from the oracle 708, the second sub level controller 122b may be trained. Using the FollowerNet 706, the oracle 708 may also train the second policy to generate valid or right validation question. In certain cases, the oracle 708 configured with the Follower-Net 706 may be deployed in an environment to train robots for navigation.

Figure 8A:
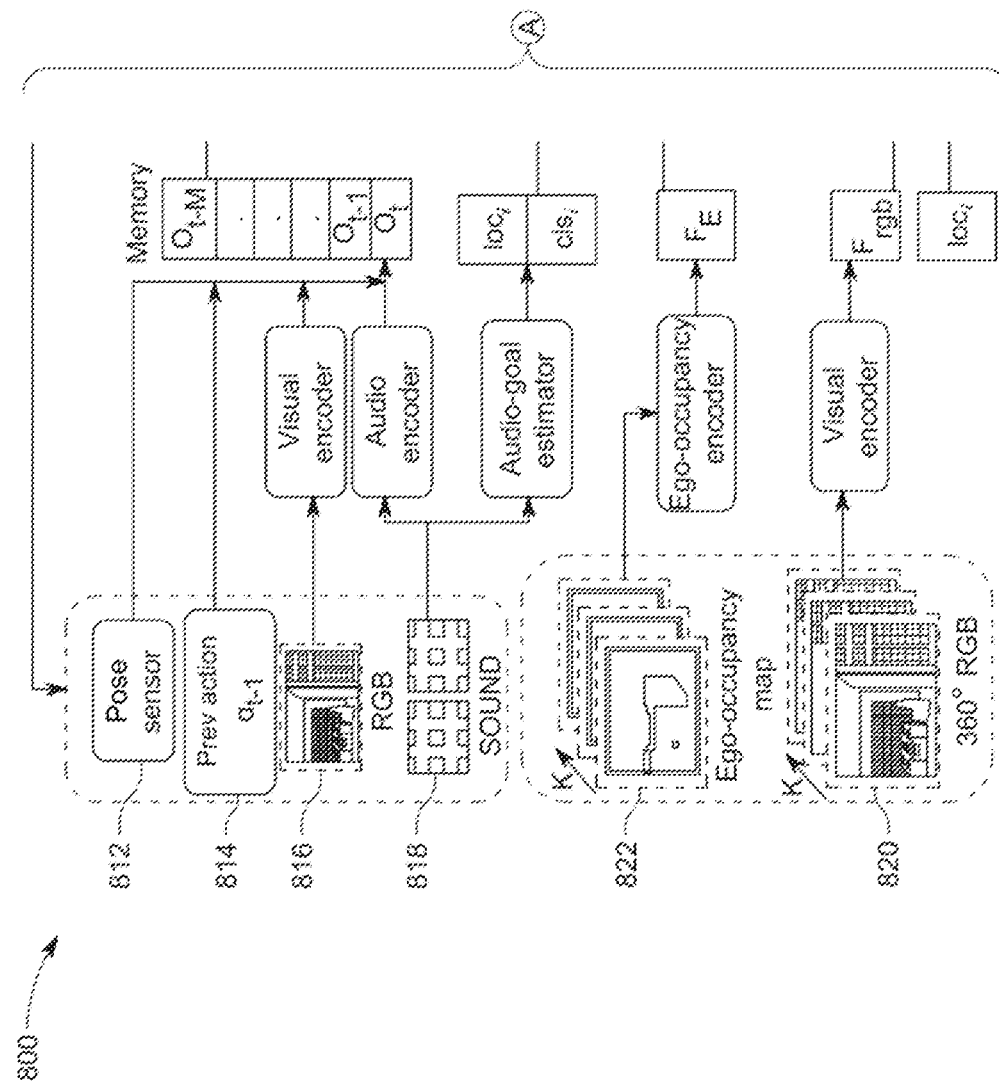
FIG. 8A illustrates a block diagram of an example trained hierarchical multimodal Reinforcement Learning (RL) neural network, according to some embodiments of the present disclosure.
Figure 8A:
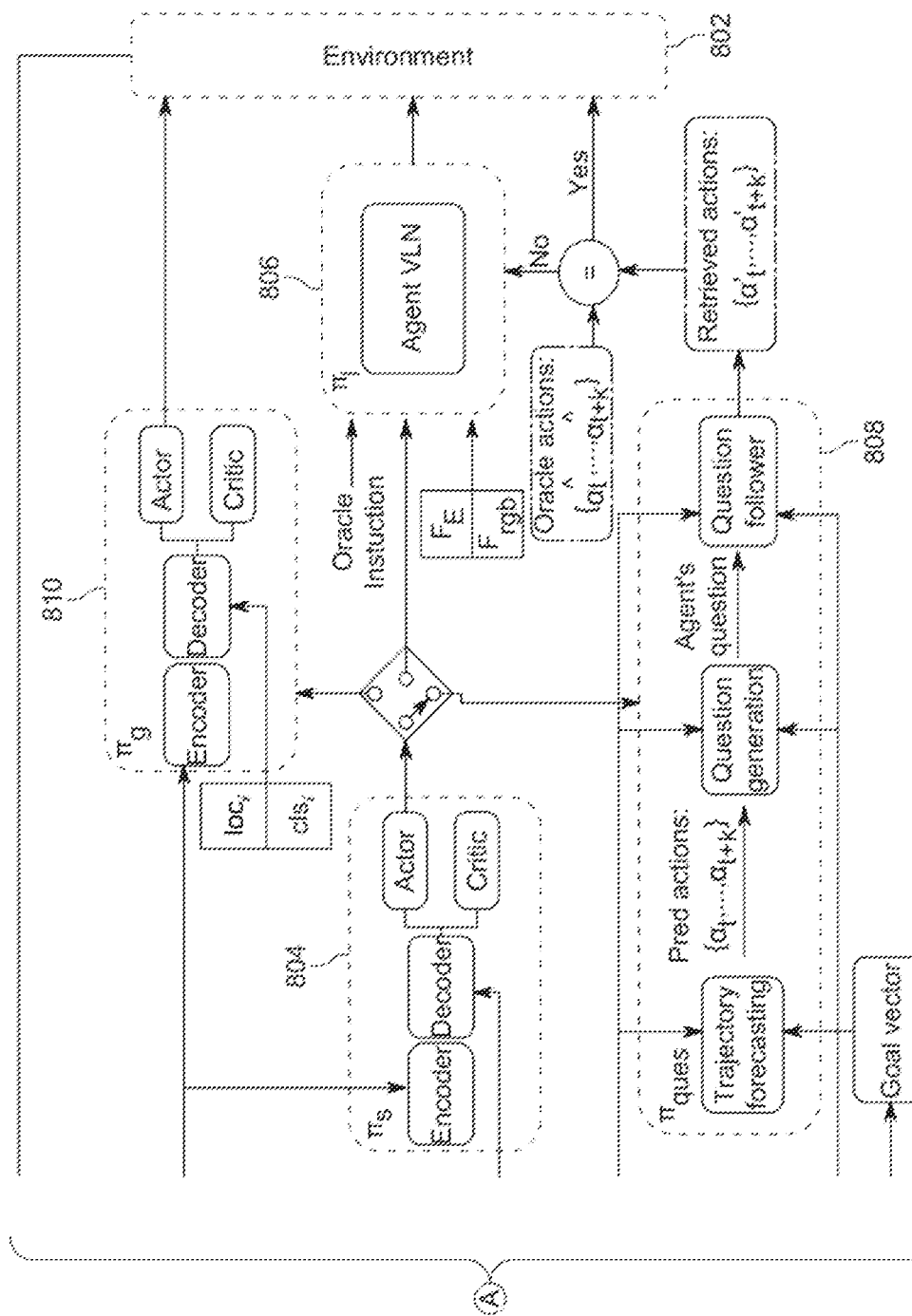

FIG. 8A, illustrated as 8A(A) and 8A(B), shows a block diagram 800 of an example trained hierarchical multimodal Reinforcement Learning (RL) neural network 118, in accordance with an embodiment. The hierarchical multimodal RL neural network 118 is configured to control the robot 100 for navigating in an environment, such as the environment 222 or 802 for reaching a goal state or completing a task. In an example, the hierarchical multimodal neural network 118 constructs a tree graph with nodes in a state space. The tree graph may have a finite number of configurations of the robot 100, wherein the tree graph may be generated for each of interaction performed by the robot 100 with the environment 222 or 802 and/or the oracle 708. In an example, the hierarchical multimodal RL neural network 118 learns to generate the tree graph for effectively controlling the robot 100.

For example, the hierarchical multimodal RL neural network 118 is implemented on a system comprising the first level controller 120 and three or more second level controllers 122. During implementation, a high-level policy 804, $\pi_r$, that is configured on the first level controller 120 is triggered to perform a task, such as a search task or a navigation task in the environment 802. In this regard, the first level controller 120 is trained to select one of three second level controllers 122 for performing a first interaction associated with the navigation task. Further, the three second sub level controllers 122 may have the low level policies configured on them, the low level policies may be trained to interact with the environment 222 or 802 and/or the oracle 708 and determine navigation steps for partially or completely performing the task. For example, the low level policies comprise a first policy 806, $\pi_l$, configured in the first sub level controller 122a, a second policy 808, $\pi_{ques}$, configured in the second sub level controller 122b, and a third policy 808, $\pi_g$, configured in the third sub level controller 122c. The first policy 806, $\pi_l$, may relate to a natural language instruction based modality, the second policy 808, $\pi_{ques}$, may relate to a natural language validation question based modality, and the third policy 810, $\pi_g$, may relate to a sensor based audio and/or video information based modality.

According to embodiments of the present disclosure, the first modality may correspond to natural language instruction query based modality. The first sub level controller 122a having the first policy 806, $\pi_l$, is configured to generate navigation steps or control command based on a natural language instruction received from the oracle 708 by querying the oracle 708 with an one-ended and/or a predefined question. A manner in which the first policy 806 operates is disclosed in detail in conjunction with FIG. 6A. Further, the second modality may correspond to a natural language question based modality. The second sub level controller 122b having the second policy 808, $\pi_{ques}$, is configured to generate navigation steps or the control command based on a validation response received from the oracle 708. For example, the oracle 708 may be queried using a validation question generated by the second sub level controller 122b. A manner in which the second policy 808 operates is disclosed in detail in conjunction with FIG. 6B, FIG. 7A, FIG. 7B, FIG. 7C and FIG. 7D. In addition, the third modality may correspond to an audio and/or video goal-based modality. The third sub level controller 122c may have the third policy 810, $\pi_g$, configured to generate navigation steps or control command based on sensor based audio and/or video information relating to the environment 802. A manner in which the third policy 810 operates is disclosed in detail in conjunction with FIG. 6C.

Pursuant to present example, during operation, the hierarchical multimodal RL neural network 118 receives pose data measured by a pose sensor 812, previous action 814 performed by the robot 100, vision data 816 (such as RGB or depth images or videos), and audio data 818 as input. For example, the training of the hierarchical multimodal RL neural network 118 may be performed using reinforcement learning, wherein each correct or desired operation performed by the hierarchical multimodal RL neural network 118 may be rewarded, whereas a penalty may be imposed for each incorrect or undesired operation. Further, the hierarchical multimodal RL neural network 118 may receive a set of images 820, such as RGB depth images, of the environment 802 indicating an area surrounding the robot 100, as input. For example, the set of images may indicate a 360 degrees view or a panoramic view around the robot 100. In addition, the input to the hierarchical multimodal RL neural network 118 may also include ego-centric occupancy maps 822.

Once the hierarchical multimodal RL neural network 118 receives the input data, the hierarchical multimodal RL neural network 118 is configured to utilize any one of the three second level controllers 122 to perform an interaction for navigation of the robot 100 in the environment 802.

Based on the selection of a second level controller and corresponding low-level policy and/or generation of a control command by the selected second level controller, reward may be given when the robot 100 moves with respect to the goal state.

Figure 8B:
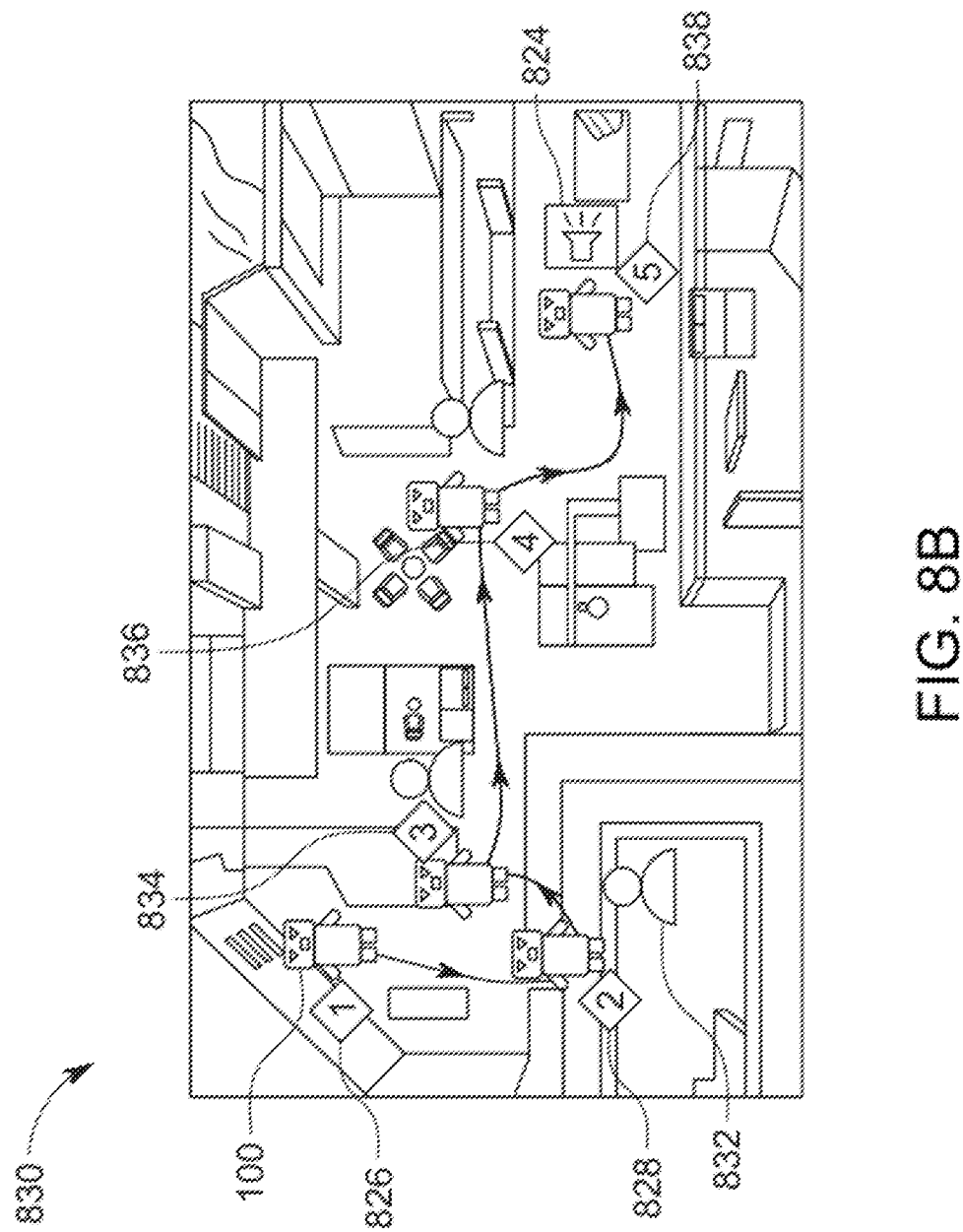
FIG. 8B shows an example navigation task, according to some embodiments of the present disclosure.

FIG. 8B shows an example BI-AVLEN navigation task, in accordance with an example embodiment. The robot 100 may have to navigate within an environment 830 to perform a navigation task to search for an audio goal 824. The robot 100 may start navigation from an initial location or first location 826. For example, to perform a first interaction for the navigation task, the first level controller 120 having the high-level policy 804 may select the third sub level controller 122c, i.e., the third policy 810. In this regard, the third policy 810 may be configured to interact to obtain third input data from the environment 830. The third input data may include, for example, sensor-based audio information, and/or sensor-based video information. Further, the third policy 810 may be configured to generate a control command for navigation of the robot 100 based on the third input data, i.e., at least one of: the sensor-based audio information or the sensor-based video information. In an example, the sensor based information may be obtained from one or more sensors associated with the robot 100. Thereafter, the robot 100 may move from the initial location 826 to a second location 828. Based on the execution of the control command, the third policy 810 may update a state of the hierarchical multimodal RL neural network 118 and relinquish control back to the high-level policy 804.

Continuing further, at the second location 828, the high-level policy 804 may be unsure about further navigation, i.e., which path to take or where to move. In this regard, the high-level policy 804 may select the first sub level controller 122a, i.e., the first policy 806. The first policy 806 may be configured to interact with an entity by querying an oracle 832 using a first predefined question from a set of predefined questions. For example, the set of predefined question may be a set of open-ended questions that the robot 100 may ask when the robot 100 is lost, does not know where to go, the robot 100 cannot hear any audio form the audio goal 824, does not know or cannot find landmarks in the environment 830 to frame a question, or may have several possible paths to choose from. By querying the oracle 832 using the first predefined question, the first policy 806 may receive first input data from the oracle 832. The first input data may include, for example, a natural language instruction. Pursuant to present example, the first policy 806 may query the oracle 832 with the first predefined question: "Where should I go?" Further, the oracle 832 may provide the natural language instruction as: "Turn around and enter the house." The first policy 806 may be configured to generate a control command for navigation of the robot 100 based on the first input data, i.e., the natural language instruction. Thereafter, the robot 100 may move from the second location 828 to a third location 834. Based on the execution of the control command, the first policy 806 may update the state of the hierarchical multimodal RL neural network 118 and relinquish control back to the high-level policy 804.

At the third location 834, the high-level policy 804 may be unsure about which trajectory or path to take form one or more possible trajectories, or the unsure if a path based on a current belief state of the hierarchical multimodal RL neural network 118 is correct or not. In this regard, the high-level policy 804 may select the second sub level controller 122b, i.e., the second policy 808. The second policy 808 may generate a validation question to query the oracle 832. For example, the second policy 808 may analyze the environment 830 to identify one or more possible trajectories or a trajectory based on the current belief state. Further, the second policy 808 may identify one or more landmarks in the environment 830 associated with the one or more possible trajectories or the trajectory based on the current belief state. Pursuant to present example step, the second policy 808 may seek validation or confirmation regarding a possible trajectory based on the current belief state of the hierarchical multimodal RL neural network 118. In this regard, the second policy 808 may generate the validation question as: "Move towards Sofa?" Further, the oracle 832 may decode the validation question and perform a path matching between a shortest path between the third location 834 and the audio goal 824 and a path generated based on the validation question. Based on the path matching, the oracle 832 may provide a second input data. For example, the second input data may include a positive validation response confirming the belief of the validation question, or a negative validation response disapproving of the belief of the validation question. Pursuant to present example, the oracle 832 may provide the second input data as "Yes", thereby confirming the belief of the validation question. Subsequently, the second policy 808 may generate a control command for navigation of the robot 100 based on the validation response and the validation question, i.e., to move the robot 100 towards the sofa in the environment 830. Based on the execution of the control command, the second policy 808 may update the state of the hierarchical multimodal RL neural network 118 and relinquish control back to the high-level policy 804.

In an example, based on the validation response and the validation question, the second policy 808 may generate the control command to move the robot towards the sofa. However, the control command may not navigate the robot 100 up to a location of sofa. To this end, once the second policy 808 queries the oracle regarding the current belief state, the second policy 808 may give back control to the high-level policy 804. The high-level policy 804 may then select the third policy 810 to navigate the robot 100 towards or up to the location of sofa based on sensor based information. In this manner, the robot 100 may arrive at a fourth location 836.

At the fourth location 836, the high-level policy 804 may be again unsure about which of one or more trajectories to take or if a trajectory based on a new current belief of the hierarchical multimodal RL neural network 118 is correct or not. Further, the high-level policy 804 may again select the second sub level controller 122b to ask a validation question to the oracle. For example, the second policy 808 may generate the validation question "Go ahead towards the hallway?" Further, the second policy 808 may receive a negative validation response as: "No go towards the kitchen". On receiving a negative validation response, the second policy 808 may recalibrate the belief and/or state of the hierarchical multimodal RL neural network 118. In one example, the second policy 808 may generate control command based on the recalibrated belief and/or state of the hierarchical multimodal RL neural network 118, and the negative validation response. In another example, based on the negative validation response, the oracle 834 may cause to give control back to one of the first sub level controller 122a or the third sub level controller 122c. In yet another example, based on the negative validation response, the second policy 808 may generate a first control command based on the negative validation response, and generate another validation question based on execution of the first control command and new state and parameters of the neural network 118 and the robot 100.

To this end, based on the validation response acquired by the second policy 808 and other environment information, the second policy 808 in association with the third policy 810 may move the robot 100 till a fifth location 838. The fifth location 838 may correspond to a location of the audio goal 824. In this manner, the robot 100 may move in an unseen environment to perform navigation task.

It will be understood that each block of the flow diagrams of the methods 300, 400, 500, 600, 620, and 640 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 206 or the storage system 207 of the robot 100, employing an embodiment of the present disclosure and executed by the processor 108 and/or the controller 116. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the methods 300, 400, 500, 600, 620, and 640 support combinations of means for performing the specified functions and combinations of operations for performing the specified functions. It will also be understood that one or more blocks of the methods 300, 400, 500, 600, 620, and 640, and combinations of blocks in the methods 300, 400, 500, 600, 620, and 640, may be implemented by special purpose hardware-based computer systems which perform the specified functions, or combinations of special purpose hardware and computer instructions.

Further using the steps described in the accompanying embodiments of the methods 300, 400, 500, 600, 620, and 640, which implement the BI-AVLEN robot 100100, the accuracy and efficiency of navigation tasks in may be highly improved. This is specifically advantageous in cases of search and rescue related operation, for example, to find and rescue patients in a hospital, to find and rescue people during a fire, performing operations on behalf of human, etc.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure.

Therefore, it is the object of the appended claims to cover all such variations and modifications as come within the true spirit and scope of the disclosure.

We claim:

1. A controller for controlling a robot, comprising:
a memory configured to store a hierarchical multimodal reinforcement learning (RL) neural network, wherein the hierarchical multimodal RL neural network includes a first level controller and at least three second level controllers, the at least three second level controllers comprising a first sub level controller, a second sub level controller and a third sub level controller, wherein the hierarchical multimodal RL neural network is configured to receive input data via an input interface of the robot such that
the first sub level controller is configured to receive the input data based on a set of predefined questions,
the second sub level controller is configured to receive the input data by generating a validation question based on a state of the hierarchical multimodal RL neural network, and
the third sub level controller is configured to obtain the input data based on the state of the hierarchical multimodal RL neural network; and
a processor configured to:
select, using the first level controller, one of the at least three second level controllers to perform a first interaction relating to a task, based at least on the state of the hierarchical multimodal RL neural network;
generate, using the selected second level controller, a control command based on the corresponding input data; and
control an operation of the robot by executing the control command.

2. The controller of claim 1, wherein when the selected second level controller is the first sub level controller, the processor is further configured to:
cause the first sub level controller to select a first predefined question from the set of predefined questions based on the state of the hierarchical multimodal RL neural network;
cause the first sub level controller to receive a first input data comprising a natural language instruction; and
cause the first sub level controller to generate the control command based on the instruction.

3. The controller of claim 1, wherein when the selected second level controller is the second sub level controller, the processor is further configured to:
receive a set of image frames, the set of image frames indicating at least depth occupancy map, or a panoramic view surrounding the robot;
cause the second sub level controller to generate the validation question based on the state of the hierarchical multimodal RL neural network;
cause the second sub level controller to receive a second input data comprising a natural language validation response; and
cause the second sub level controller to generate the control command based on the validation response.

4. The controller of claim 3, wherein when the second input data comprises the validation response and natural language data, the processor is further configured to:
cause the second sub level controller to generate the control command based on the validation response; and
update the state of the hierarchical multimodal RL neural network based on the natural language data and the execution of the control command.

5. The controller of claim 3, wherein when the second input data comprises a negative validation response or the second sub level controller fails to receive the second input data, the processor is further configured to:
cause to terminate operation of the second sub level controller; and
cause to execute at least one of: the first sub level controller or the third sub level controller for performing the first interaction, based on an external input.

6. The controller of claim 3, wherein when the second input data comprises a negative validation response or the second sub level controller fails to receive the second input data, the processor is further configured to:

cause the second sub level controller to generate a first control command based on the state of the hierarchical multimodal RL neural network;

cause the second sub level controller to control the robot based on the first control command;

cause the second sub level controller to update the state of the hierarchical multimodal RL neural network based on the execution of the first control command; and cause the second sub level controller to generate a second validation question based on the updated state of the hierarchical multimodal RL neural network.

7. The controller of claim 1, wherein the hierarchical multimodal RL neural network is trained end-to-end using the reinforcement learning without incurring a penalty when the validation question generated by the second sub level controller forms an answer to one of the set of predefined question used by the first sub level controller to generate the control command.

8. The controller of claim 1, wherein the input data received by at least one of the first sub level controller or the second sub level controller is generated by an oracle.

9. The controller of claim 8, wherein the processor is further configured to:

receive a validation response for the validation question from the oracle, based on the oracle decoding the validation question and providing the validation response based on a matching between a shortest path between a current pose of the robot and a goal pose of the task, and a path based on the decoded validation question; and train the hierarchical multimodal RL neural network based on the validation response.

10. The controller of claim 1, wherein when the selected second level controller is the third sub level controller, the processor is further configured to:

cause the third sub level controller to generate the control command based on the state of the hierarchical multimodal RL neural network.

11. The controller of claim 1, wherein the corresponding input data received by at least one of the first sub level controller or the second sub level controller is in natural language.

12. The controller of claim 1, wherein the processor is further configured to:

update, using the selected second level controller, the state of the hierarchical multimodal RL neural network based on the execution of the first interaction, wherein the first interaction is performed between the controller and at least one of an environment, or an entity associated with the task; and select, using the first level controller, one of the at least three second level controllers to perform a second interaction relating to the task, based at least on the input data and the updated state of the hierarchical multimodal RL neural network, wherein the second interaction is performed after the first interaction for completing the task.

13. The controller of claim 1, wherein the processor is further configured to:

determine a resource constraint associated with selection of each of the at least three second level controllers; and select, using the first level controller, one of the at least three second level controllers, based on the determined resource constraint.

14. The controller of claim 1, wherein at least one of: the input data or the state of the hierarchical multimodal RL neural network, as used by the first sub level controller, the second sub level controller and the third sub level controller are different.

15. The controller of claim 1, wherein the first sub level controller is configured to determine the control command based on a natural language instruction received in response to a first predefined question from the set of predefined questions;

the second sub level controller is configured to determine the control command based on a validation response received in response to the generated validation question; and the third sub level controller is configured to determine the control command based on at least one of: sensor-based audio information or sensor-based video information.

16. The controller of claim 1, wherein the state of the hierarchical multimodal RL neural network comprises at least one of: a set of state variables associated with the state of the hierarchical multimodal RL neural network or a current belief state of the hierarchical multimodal RL neural network.

17. A method for controlling a robot, the method comprising:

selecting, using a first level controller, one of at least three second level controllers to perform a first interaction relating to a task based at least on a state of a hierarchical multimodal RL neural network, wherein the hierarchical multimodal RL neural network includes the first level controller and at least three second level controllers, the at least three second level controllers comprising a first sub level controller, a second sub level controller and a third sub level controller, wherein the hierarchical multimodal RL neural network is configured to receive input data via an input interface of the robot such that the first sub level controller is configured to receive the input data based on a set of predefined questions, the second sub level controller is configured to receive the input data by generating a validation question based on the state of the hierarchical multimodal RL neural network, and the third sub level controller is configured to obtain the input data based on the state of the hierarchical multimodal RL neural network;

generating, using the selected second level controller, a control command based on the corresponding input data; and controlling an operation of the robot by executing the control command.

18. The method of claim 17, wherein the first sub level controller is configured to determine the control command based on a natural language instruction received in response to a first predefined question from the set of predefined questions;

the second sub level controller is configured to determine the control command based on a validation response received in response to the generated validation question; and the third sub level controller is configured to determine the control command based on at least one of: sensor-based audio information or sensor-based video information.

19. The method of claim 17, the method further comprising:

receiving a set of image frames, the set of image frames indicating at least depth occupancy map, or a panoramic view surrounding the robot;

causing the second sub level controller to generate the validation question based on the state of the hierarchical multimodal RL neural network;

causing the second sub level controller to receive a second input data comprising a natural language validation response; and causing the second sub level controller to generate the control command based on the validation response.

20. A non-transitory computer readable storage medium embodied thereon a program executable by a processor for performing a method, the method comprising:

selecting, using a first level controller, one of at least three second level controllers to perform a first interaction relating to a task based at least on a state of a hierarchical multimodal RL neural network, wherein the hierarchical multimodal RL neural network includes the first level controller and at least three second level controllers, the at least three second level controllers comprising a first sub level controller, a second sub level controller and a third sub level controller, wherein the hierarchical multimodal RL neural network is configured to receive input data via an input interface of the robot such that the first sub level controller is configured to receive the input data based on a set of predefined questions, the second sub level controller is configured to receive the input data by generating a validation question based on the state of the hierarchical multimodal RL neural network, and the third sub level controller is configured to obtain the input data based on the state of the hierarchical multimodal RL neural network;

generating, using the selected second level controller, a control command based on the corresponding input data; and controlling an operation of the robot by executing the control command.

* * * * *